US007925679B2

(12) United States Patent
Schwartz et al.

(10) Patent No.: US 7,925,679 B2
(45) Date of Patent: Apr. 12, 2011

(54) SYSTEM AND PROGRAM FOR RESULT SET MANAGEMENT

(75) Inventors: Michael Stephen Schwartz, Bronx, NY (US); Naga A. Ayachitula, Elmsford, NY (US); Shu-Ping Chang, Shrub Oak, NY (US); Lenisha V. Gandhi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/205,788

(22) Filed: Sep. 5, 2008

(65) Prior Publication Data
US 2009/0006491 A1 Jan. 1, 2009

Related U.S. Application Data

(63) Continuation of application No. 10/654,807, filed on Sep. 3, 2003, now Pat. No. 7,440,960.

(51) Int. Cl.
*G06F 7/00* (2006.01)
*G06F 17/30* (2006.01)
(52) U.S. Cl. ........................ 707/803; 707/758
(58) Field of Classification Search ............... 707/803, 707/758, 999.001, 999.003, 999.01, 999.1, 707/999.101, 999.002; 717/127
See application file for complete search history.

(56) References Cited

U.S. PATENT DOCUMENTS

| | | | |
|---|---|---|---|
| 5,542,087 A | 7/1996 | Neimat et al. |
| 5,632,015 A | 5/1997 | Zimowski et al. |
| 5,832,484 A | 11/1998 | Sankaran et al. |
| 5,887,171 A | 3/1999 | Tada et al. |
| 5,926,807 A | 7/1999 | Peltonen et al. |
| 5,960,434 A | 9/1999 | Schimmel |
| 6,009,271 A | 12/1999 | Whatley |
| 6,067,547 A | 5/2000 | Douceur |
| 6,434,570 B1 | 8/2002 | Rangan |
| 6,651,067 B1 | 11/2003 | Gorelik et al. |
| 7,191,170 B2 | 3/2007 | Ganguly et al. |
| 2002/0107835 A1 | 8/2002 | Coram et al. |
| 2003/0167379 A1 | 9/2003 | Soltis, Jr. |

OTHER PUBLICATIONS

Adaptec, "Adaptec Toast 4: User's Guide", © 1994-2000 Adaptec, Inc, 76 pp.
NuovoDoc, "DMA Query Model", [Online], Oct. 2006, © 1999-2006, NuovoDoc. Retrieved from the Internet at <URL: http://www.infonuovo.com/dma/dma1.0-7/query.htm>, 31 pp.
PlanetMath, "PlanetMath: Hashing", [online], Aug. 2002. Retrieved from the Internet at <URL: http://web.archive.org/web/20030715110524/http://planetmath.org/>, 7 pp.

*Primary Examiner* — Brent Stace
(74) *Attorney, Agent, or Firm* — Janaki K. Davda; Konrad Raynes & Victor LLP

(57) ABSTRACT

Disclosed is a technique for result set management. One or more result sets are stored. Each result set was generated by executing a query. When at least one of a number of result sets that may be stored and a number of bucket tables that may hold result sets is modified, it is determined whether any of the one or more result sets are to be removed. When it is determined that one or more of the result sets are to be removed, those result sets are removed.

22 Claims, 18 Drawing Sheets

400

| Column Name | Type of Field |
|---|---|
| Set_Id | Numeric |
| Current_Set_Id | Numeric |
| Bucket_Table | Characters |
| Current_Bucket_Table | Characters |
| Owned_By | Character(s) |
| Set_Name | Character(s) |
| Set_Description | Character(s) |
| Created_Ts | Timestamp |
| Query | CLOB |
| Set_Count | Numeric |
| Saved_Complete_Flag | Character |

| Set_Id | Key | Created_Ts |
|---|---|---|
|  |  |  |

600

| Set_Id | Bucket_Table | Created_Ts | Status |
|---|---|---|---|
|  |  |  |  |

700

| Set_Id | Bucket_Table | Created_Ts | Set_Count |
|---|---|---|---|
|  |  |  |  |

SYSTEM AND PROGRAM FOR RESULT SET MANAGEMENT

CROSS-REFERENCE TO RELATED APPLICATIONS

This application is a continuation of and claims the benefit of application Ser. No. 10/654,807, filed Sep. 3, 2003, "METHOD, SYSTEM, AND PROGRAM FOR RESULT SET MANAGEMENT", the entire contents of which is incorporated herein by reference.

BACKGROUND OF THE INVENTION

1. Field of the Invention

The present invention is related to result set management (e.g., in a data store).

2. Description of the Related Art

A database system is one in which data is stored, retrieved, and processed. Data records in a relational database management system (RDBMS) in a computer are maintained in tables, which are a collection of rows all having the same columns. Each column maintains information on a particular type of data for the data records which comprise the rows. Tables in the database are searched using, for example, a Structured Query Language (SQL), which specifies search operations or predicates to perform on columns of tables in the database to qualify rows in the database tables that satisfy the search conditions.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

Given a database system in which queries are performed, it is difficult to manage saving and removing of the results of the queries. The results may also be referred to as "result sets." Each record is identified by a unique key. A record is formed from a set of table(s). The results may be saved in cache, but are eventually, and usually quickly, removed from the database system and replaced with new results. Therefore, if a user wants to later obtain the result set for a point in time without re-executing a query, the user is typically unable to do so.

Therefore, there is a need in the art for an improved technique for result set management.

SUMMARY OF THE INVENTION

Provided are a system and program for result set management. One or more result sets are stored. Each result set was generated by executing a query. When at least one of a number of result sets that may be stored and a number of bucket tables that may hold result sets is modified, it is determined whether any of the one or more result sets are to be removed. When it is determined that one or more of the result sets are to be removed, those result sets are removed.

BRIEF DESCRIPTION OF THE DRAWINGS

Referring now to the drawings in which like reference numbers represent corresponding parts throughout:

FIG. 4 illustrates columns and type of field data for a Result Sets Table of Contents in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
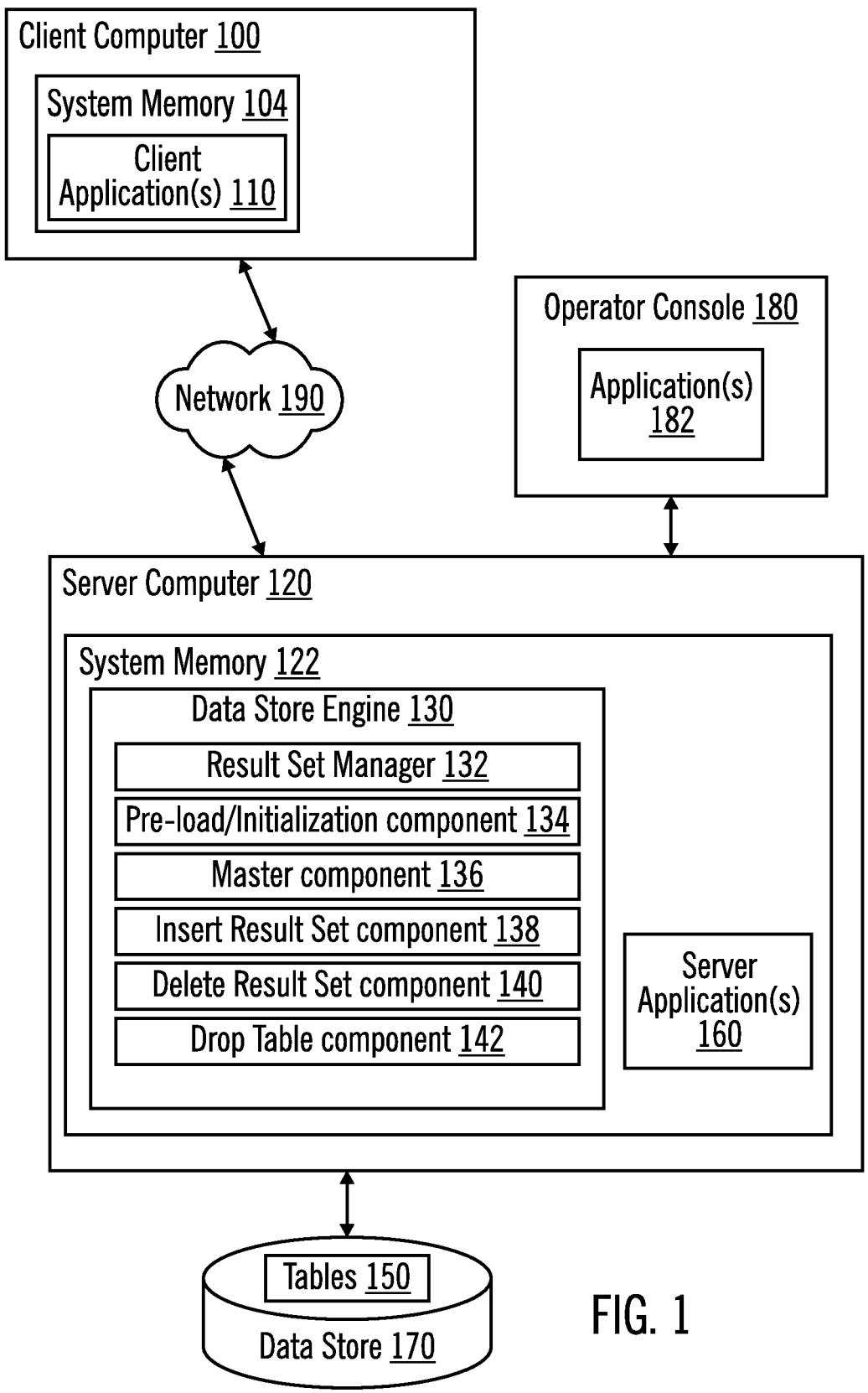
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. A data store engine 130 executes in the system memory 122. A result set manager 132 executes as part of the data store engine 130. In certain implementations of the invention, the result set manager 132 includes a pre-load/non-initialization component 134, a master component 136, an insert result set component 138, a delete result set component 140, and a drop table component 142. Although components 134, 136, 138, 140, and 142 are illustrated as separate components within a result set manager 132, the functionality of the components 134, 136, 138, 140, and 142 may be implemented in fewer or more or different components than illustrated. Additionally, the functionality of the components 134, 136, 138, 140, and 142 may be implemented at a Web application server computer or other server computer that is connected to the server computer 120. Additionally, one or more server applications 160 execute in system memory 122.

The server computer 120 provides the client computer 100 with access to data in a data store 170 (e.g., a database). Although a single data store 170 is illustrated for ease of understanding, tables 150 and other data in data store 170 may be stored in data stores at other computers connected to server computer 120. Also, an operator console 180 executes one or more applications 182 and is used to access the server computer 120 and the data store 170. Although tables 150 are referred to herein for ease of understanding, other types of structures may be used to hold the data that is described as being stored in tables 150.

The data store 170 may comprise an array of storage devices, such as Direct Access Storage Devices (DASDs), Just a Bunch of Disks (JBOD), Redundant Array of Independent Disks (RAID), virtualization device, etc. The data store 170 includes tables 150 that are used with implementations of the invention.

Figure 2:
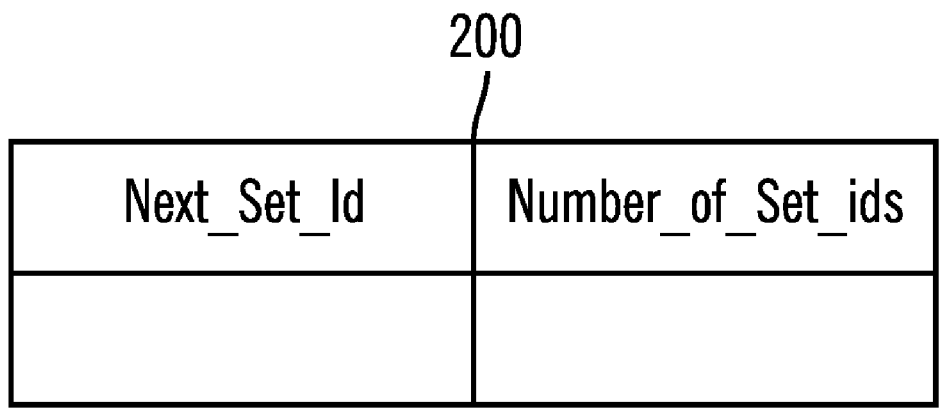
FIG. 2 illustrates a Next Set Id table in accordance with certain implementations of the invention.

FIG. 2 illustrates a Next Set Id table 200 in accordance with certain implementations of the invention. The Next Set Id table 200 has columns for Next_Set_Id and Number_of_Set_Ids, each of which may be a numeric field. The Next Set Id table 200 indicates how many result sets may be saved and identifies the next set id to use for saving a result set. Once the maximum number of result sets is reached, then the next set id value wraps around to the beginning of the possible values. For example, if 100 is the maximum number of result sets, and 0-99 are the available values, then, after 99, the next set id wraps around to 0. In certain implementations of the invention, the Next Set Id table 200 consists of one row, and the Next_Set_Id starts from 0.

Figure 3:
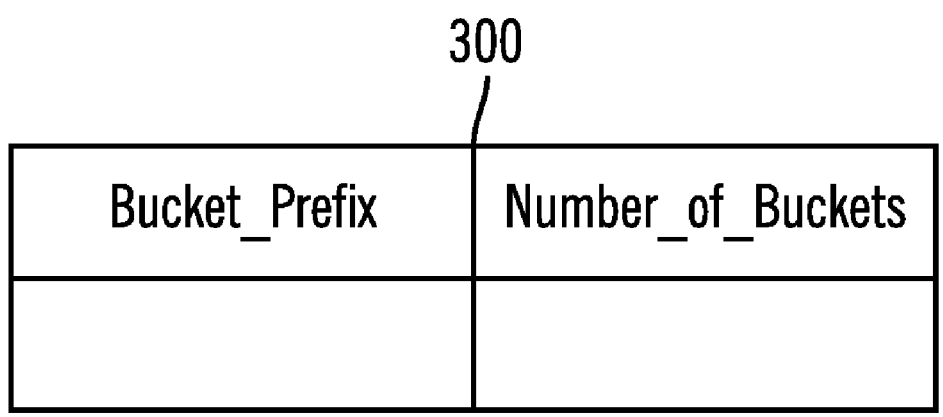
FIG. 3 illustrates a Buckets Definition table in accordance with certain implementations of the invention.

FIG. 3 illustrates a Buckets Definition table 300 in accordance with certain implementations of the invention. The Buckets Definition table 300 has a column for the prefix of the table (Bucket_Prefix) for each bucket and a column for the number of buckets (Number_of_Buckets). The Buckets Definition table 300 controls whether all result sets are saved in one bucket table or multiple bucket tables. Each bucket table (further described with respect to FIG. 5) stores one or more result sets. In certain implementations, the Buckets Definition table 300 consists of one row with the prefix and the number of buckets.

In certain implementations, concatenating the value of the Bucket_Prefix with the bucket number (i.e., the value of Number_of_Buckets) forms the name of the bucket table. In certain implementations of the invention, the first bucket is 0. For example, if the Bucket_Prefix is "RS_" and the Number_of_Buckets is "2", then two bucket tables named RS_0 and RS_1 are created. Bucket_Prefix may be a character field and Number_of_Buckets may be a numeric field. The length of a table name in a data store 170 has a size limit and therefore the Bucket_Prefix concatenated with the maximum bucket number which is Number_of_Buckets−1 must be less than or equal to this limit.

FIG. 4 illustrates columns and type of field data for a Result Sets Table of Contents 400 in accordance with certain implementations of the invention. The Results Sets Table of Contents 400 includes a row for each existing result set. The Results Sets Table of Contents 400 has columns for Set_Id, Current_Set_Id, Bucket_Table, Current_Bucket_Table, Owned_By, Set_Name, Set_Description, Created_Ts, Query, Set_Count, and Saved_Complete_Flag.

There may be a unique index on the Set_Id column, which provides a result set identifier. Current_Set_Id refers to the result set identifier associated with the result set for which the row was created. Set_Id is equal to Current_Set_Id when the system is initialized. If the number of result sets is decreased (i.e., Number_of_Set_Ids is decreased), then Set_Id may be updated, while Current_Set_Id is not updated. Therefore, Set_Id may be different from Current_Set_Id, while the result set has not been reused. Once the result set is reused, then Set_Id is equal to Current_Set_Id.

Bucket_Table identifies the table in which a result set is stored. If the number of buckets (Number_of_Buckets) changes, then Bucket_Table may be updated, while Current_Bucket_Table is not updated. Therefore, Bucket_Table and Current_Bucket_Table are not equal if the bucket table associated to a given Set_Id modulo the total number of buckets changes, the Set_Id will go into when the Set_Id is reused. Otherwise, Bucket_Table and Current_Bucket_Table are equal.

When a result set is completely saved in a bucket table, then the Saved_Complete_Flag is set to a first value (e.g., one), otherwise the Saved_Complete_Flag is set to a second value (e.g., zero). Set_Count indicates how many records have been saved for a result set. When the Saved_Complete_Flag is equal to the first value (e.g., one), then Set_Count represents how many records are in a result set. Owned_By is set to the identity of the person who created the result set. Set_Name is the result set's name, and, in certain implementations, Set_Name is S appended by the Current_Set_Id. For example, a result set name may be "S0" when the Current_Set_Id is 0. This is the initial result set name and can be changed by the owner of the result set. Set_Description describes a result set, and, in certain implementations, the default is the first few characters of the Query. Set_Description may be changed by the owner. Created_Ts is the time at which the result set was created. Query contains the actual query which created this result set.

After the Buckets Definition table 300 and the Result Sets Table of Contents 400 are defined, the Result Sets Table of Contents may be preloaded, result sets may be saved in a Bucket table, result sets may be deleted, the number of buckets may be changed, and, the number of set ids may be changed.

Figure 5:
FIG. 5 illustrates a Bucket table in accordance with certain implementations of the invention.

FIG. 5 illustrates a Bucket table 500 in accordance with certain implementations of the invention. The Bucket table 500 has columns for Set_Id, Key, and Created_Ts. If there are "n" number of buckets in Buckets Definition table 300, then there are "n" Bucket tables 500. There may be a unique index on columns Set_Id, Key, and Created_Ts. Set_Id in a Bucket table is equal to Current_Set_Id in the Result Sets Table of Contents 400. Key is the unique key that identifies a record in the system. Key is a unique value. Created_Ts is a timestamp which is equal to the timestamp for the result set in the Result Sets Table of Contents 400. There may be multiple rows with the same Set_Id and same Created_Ts, but each row will have a unique key value.

In FIGS. 6-9, an Input Structure table 600 describes an input structure (e.g., a queue) for result sets, a Deletion Structure table 700 describes a deletion structure (e.g., a queue) for results sets, a Drop Bucket table 800 is used for dropping of a bucket table when the bucket table is no longer used, and a Statistics table 900 is used to determine an average number of records that may be deleted in an hour by a single process.

Figure 6:
FIG. 6 illustrates an Input Structure table in accordance with certain implementations of the invention.

FIG. 6 illustrates an Input Structure table 600 in accordance with certain implementations of the invention. The Input Structure table 600 has columns for Set_Id, Bucket_Table, Created_Ts, and Status. The Input Structure table 600 has a row for each set id and is used to put data from a result set into a bucket table. The Set_Id in the Input Structure is equal to the Set_Id in the Result Sets Table of Contents 400 initially. Bucket_Table corresponds to the Bucket_Table in the Result_Sets Table of Contents 400 initially. The Created_Ts is equal to the Created_Ts in the Result Sets Table of Contents 400 initially. Status is a first value (e.g., −1) or a second value (e.g., 1), where the first value (e.g., −1) indicates the insertion of the result sets in a Bucket table has not begun and the second value (e.g., 1) indicates that the insertion is in progress. There may be a unique index consisting of Set_Id and Created_Ts.

Figure 7:
FIG. 7 illustrates a Deletion Structure table in accordance with certain implementations of the invention.

FIG. 7 illustrates a Deletion Structure table 700 in accordance with certain implementations of the invention. The Deletion Structure table 700 has columns for Set_Id, Bucket_Table, Created_Ts, and Set_Count. Set_Id contains the Current_Set_Id from the Result Sets Table of Contents 400. The Deletion Structure table 700 has a row for each set id and is used to remove data of a result set from a bucket table. Set_Id identifies the result set. Bucket_Table contains the Current_Bucket_Table from the Result Sets Table of Contents 400. Created_Ts contains the timestamp for the given Current_Set_Id from the Result Sets Table of Contents 400. Set_Count contains the number of records this result set contains. There may be an index on Set_Id and Created_Ts.

Figures 8, 9:
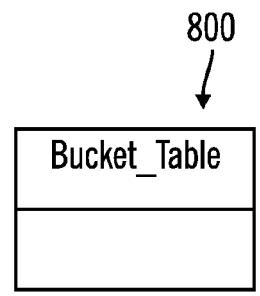
FIG. 8 illustrates a Drop Bucket table in accordance with certain implementations of the invention.
FIG. 9 illustrates a Statistics table in accordance with certain implementations of the invention.

FIG. 8 illustrates a Drop Bucket table 800 in accordance with certain implementations of the invention. The Drop Bucket table 800 includes a column for Bucket_Table. There may be a unique index on Bucket_Table. The Drop Bucket table 800 represents the table to be dropped if the number of buckets are decreased. Once a bucket table is empty and is listed in the Drop Bucket table 800, then the bucket table will be dropped.

FIG. 9 illustrates a Statistics table 900 in accordance with certain implementations of the invention. The Statistics table 900 includes columns for Timestamp_begin, Timestamp_end, Timestamp_Interval, Number_of_Records_Deleted, Number_of_Processes_Involved, and Average_Number_of_Records_Deleted. From the statistics, the delete result set component 140 determines how many processes are needed to delete a set of records within a given time interval. Additionally, the statistics may be used to determine how many records may be deleted at one time. The Statistics table is cleaned up based upon an initialization parameter that indicates how many days of information should be retained in the Statistics table, and the delete result set component 140 takes care of this. Timestamp_begin and Timestamp_end are timestamps that are recorded by the delete result set component 140 after performing deletion processing. Timestamp_interval is Timestamp_end−Timestamp_begin. Additionally, Number_of_Records_Deleted, Number_of_Processes_Involved and Average_Number_of_Records_Deleted are numeric fields.

Figure 10:
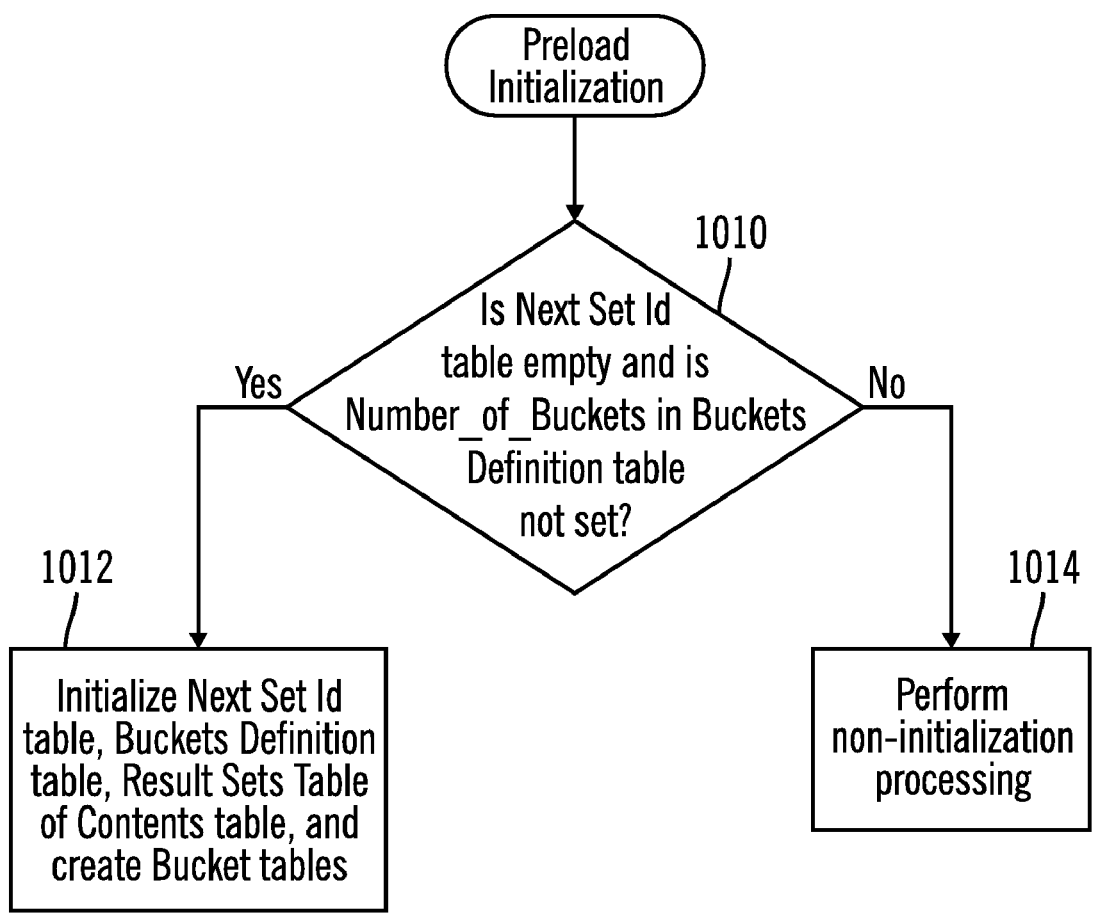
FIG. 10 illustrates logic implemented in a pre-load/non-initialization component for preload initialization in accordance with certain implementations of the invention.

FIG. 10 illustrates logic implemented in the pre-load/non-initialization component 134 for preload initialization in accordance with certain implementations of the invention. In block 1010, the pre-load/non-initialization component 134 determines whether the Next Set Id table 200 is empty and the Number_of_Buckets in the Buckets Definition table 300 has not been set. If so, processing continues to block 1012, otherwise, processing continues to block 1014. In block 1012, the pre-load/non-initialization component 134 initializes the Next Set Id table 200, the Buckets Definition table 300, and the Result Sets Table of Contents 400, and the pre-load/non-initialization component 134 creates the Bucket Tables 500. In block 1014, non-initialization processing is performed. That is, initially, the Bucket_Prefix in the Buckets Definition table 300 is set. Then, the Next Set Id table 200, the Buckets Definition table 300, and the Result Sets Table of Contents 400 are loaded. In certain implementations, a system administrator may specify the data to be loaded into the tables 200, 300, and 400 (e.g., Number_of_Set_Ids, Number_of_Buckets, etc.). In certain alternative implementations, the data to be loaded into the tables 200, 300, and 400 may be predetermined defaults.

In certain implementations of the invention, the preload initialization logic of FIG. 10 is performed in standalone mode for a data store 170. In certain alternative implementations of the invention, the preload initialization logic of FIG. 10 is performed while the server computer 120 is performing other processing. To preload the Next Set Id table 200, the Buckets Definition table 300, and the Result Sets Table of Contents 400, the maximum number of result sets and the total number of buckets is specified by, for example, a system administrator or set based on a predetermined default value. If the Next Set Id table 200 is empty and the Number_of_Buckets in the Buckets Definition table 300 is not set, then the Bucket tables 500 are created with the layout in FIG. 5, and the Result Sets Table of Contents 400 is filled.

If a DropBuckets file and a CreateBuckets file (that would have been created by a previous run of the result set manager 132) exists, then the DropBuckets file is executed to drop all the bucket tables identified in the file, and the Result Sets Table of Contents table 400 is dropped and recreated. This may happen if a previous preload initialization failed. Otherwise, the DropBuckets file and the CreateBuckets file are created, and then the CreateBuckets file is executed to create the Bucket tables 500. In certain implementations, the names of the Bucket tables 500 are formed by the Bucket_Prefix concatenated with the bucket number. In certain implementations, the bucket number may be between 0 and Number_of_Buckets−1, where Number_of_Buckets is greater than or equal to 1, and the Number_of_Set_Ids is greater than or equal to 1.

Once this is completed, the Result Sets Table of Contents table 400 is created and initialized. The Set_Id and Current_Set_Id are set to be the same number. The Bucket_table and Current_Bucket_table are set to be the same string. Every Set_Id between 0 and Number_of_Set_Ids−1 is inserted into the table. The Bucket table which a given Set_Id belongs to is determined by looking at the remainder from the Set_Id divided by the Number_of_Buckets. This determines which bucket table is recorded into Bucket_table and Current_Bucket_table. The name of the Bucket table is the Bucket_Prefix concatenated with the modulo remainder of the division of the Set_Id by the Number_of_Buckets. Owned_By may be defaulted to a system identifier such as admin. Set_Name may be defaulted to PRELOAD concatenated with Set_Id. Set_Description may be set equal to PRELOAD. Query may be set to a default query. Created_Ts may be set equal to the current timestamp. Set_Count may be set equal to 0, and Saved_Complete_Flag may be set to the first value (e.g., 1).

The Next Set Id table is created with one row containing the value 0 for Next_Set_Id, and the maximum number of results sets for Number_of_Set_Ids. The Buckets Definition table 300 is updated with the total number of buckets being placed in the Number_of_Buckets column for the Bucket_Prefix. Once this is completed, then the DropBuckets and CreateBuckets files are deleted.

Figure 11A:
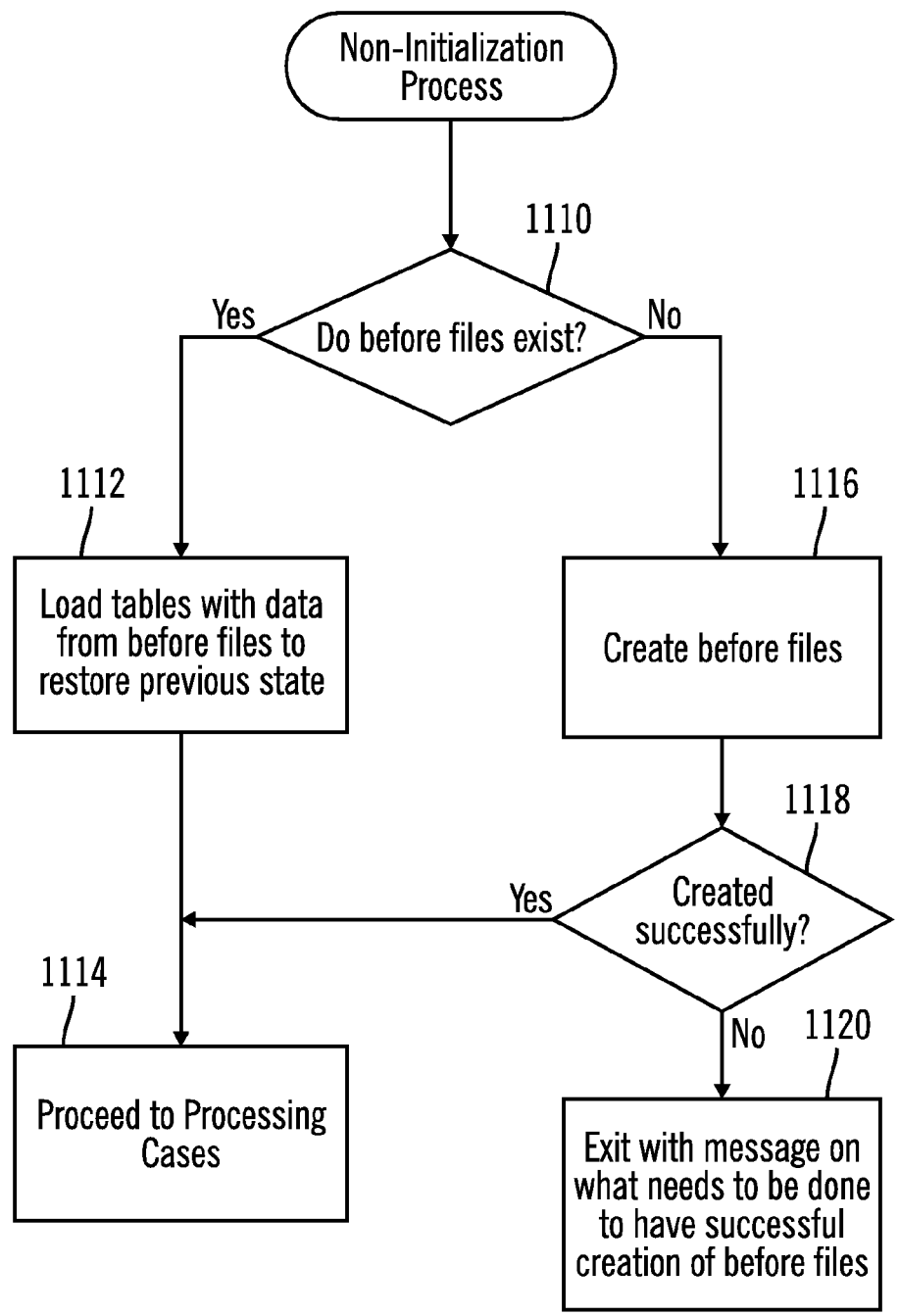
FIGS. 11A, 11B, and 11C illustrate logic implemented in a pre-load/non-initialization component to perform non-initialization processing in accordance with certain implementations of the invention.
Figure 11B:
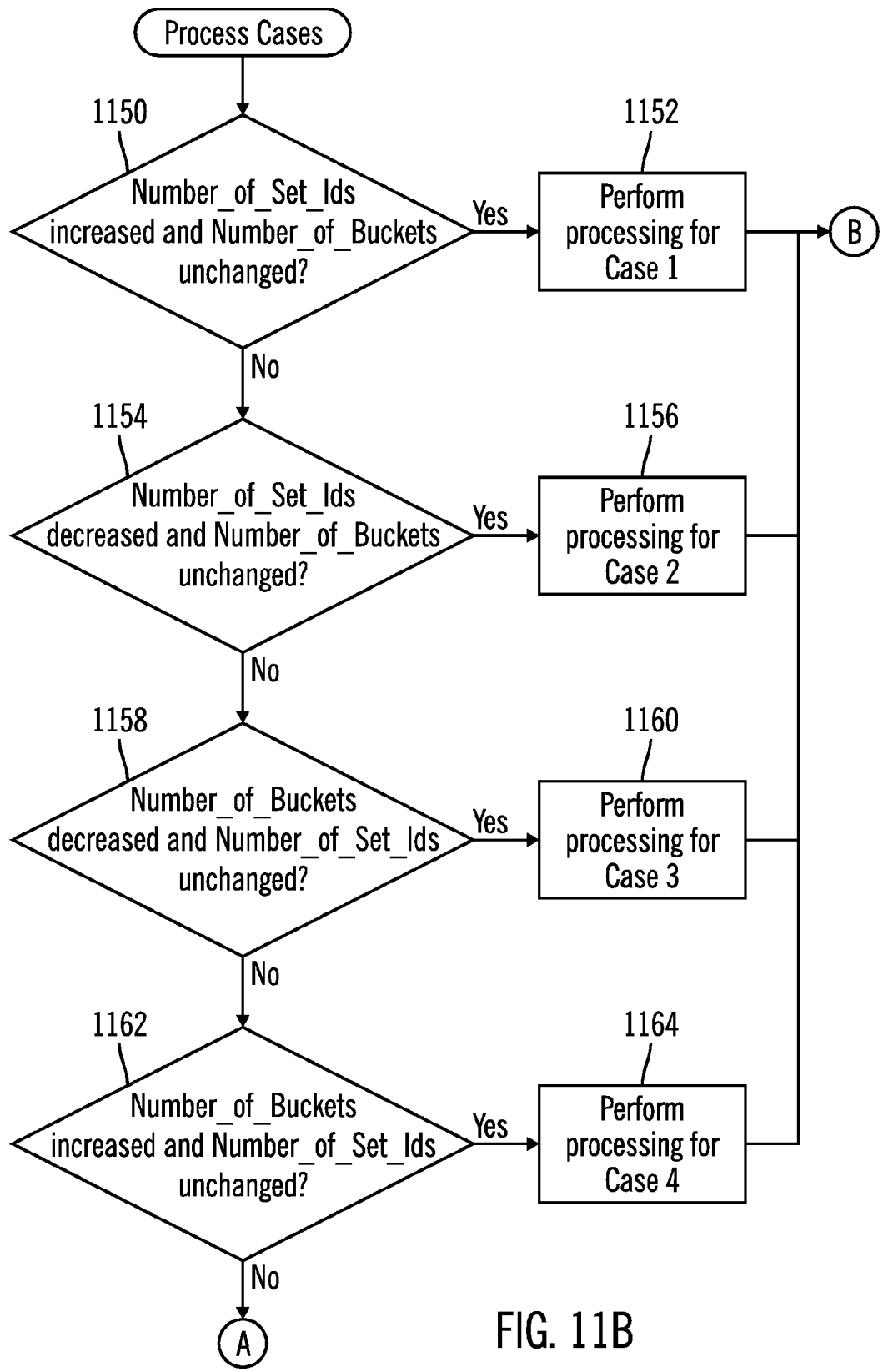
Figure 11C:
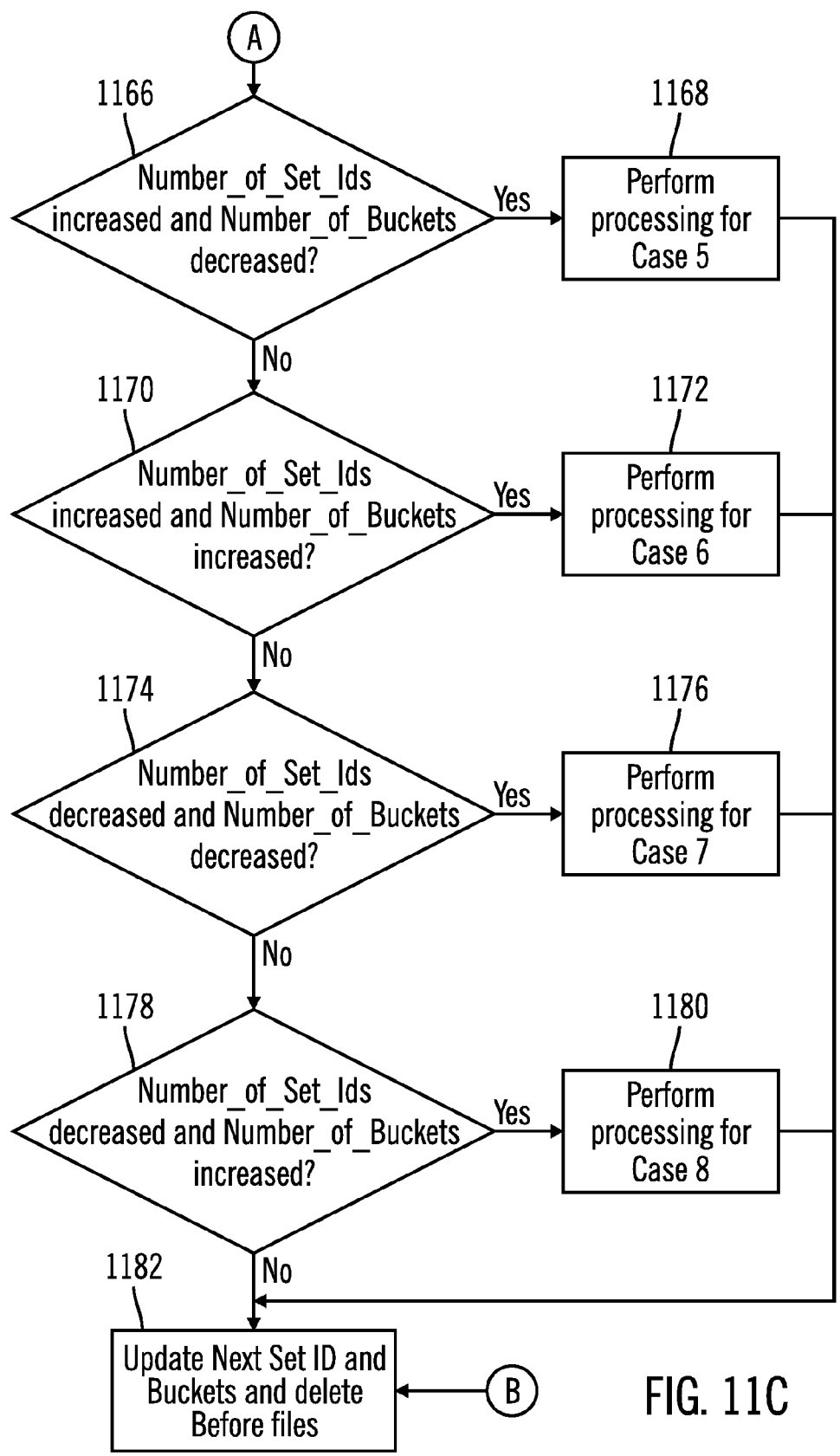

FIGS. 11A, 11B, and 11C illustrate logic implemented in the pre-load/non-initialization component 134 to perform non-initialization processing in accordance with certain implementations of the invention. In certain implementations of the invention, the non-initialization logic of FIGS. 11A, 11B, and 11C is run in standalone mode. In certain alternative implementations of the invention, the non-initialization logic of FIGS. 11A, 11B, and 11C is performed while the server computer 120 is performing other processing. The non-initialization processing sets up various tables and cleans up one or more temporary files, named "before files".

The non-initialization processing may be performed when the Number_of_Set_Ids is changed and/or the Number_of_Buckets is changed by implementations of the invention or by a system administrator. Before any changes to the tables 200, 300, and 400 are made, control begins at block 1110, with the pre-load/non-initialization component 134 determining whether one or more before files exist. If so, processing continues to block 1112, otherwise, processing continues to block 1116. That is, if one or more before files exist, then the non-initialization processing was invoked previously ("before"), and there are a set of files (i.e., "before files") that represent the backup of the tables 200, 300, 400, 600, 700, and 800. In block 1112, the tables 200, 300, 400, 600, 700, and 800 are restored from the backup before files using, for example, a data store utility to reload the tables 200, 300, 400, 600, 700, and 800 with the original data to restore the previous state. Then, specific cases may be processed (block 1114).

If one or more before files did not exist, then, in block 1116, before files are created. In particular, the tables 200, 300, 400, 600, 700, and 800 are unloaded to files whose names start with "before" followed by the table name (block 1120).

In block 1118, the pre-load/non-initialization component 134 determines whether the before files were created successfully. If so, processing continues to block 1114. That is, once the before files are successfully created, a before file (e.g., "beforeresults1") is created to indicate the unload of tables 200, 300, 400, 600, 700, and 800 completed successfully. At this point, specific cases may be processed (block 1114). If the unload of the tables 200, 300, 400, 600, 700, and 800 fails, then the processing exits with a message indicating what has to be done to have successful creation of the before files that were not created successfully are deleted.

Also, when the Number_of_Set_Ids is increased or decreased, which bucket a Set_Id goes into is based upon modulo arithmetic, where the remainder of the division of the Set_Id by the Number_of_Buckets determines which Bucket_table said Set_Id belongs to. This is applicable to several of the cases discussed below.

In FIGS. 11B and 11C, specific cases are processed. In block 1150, the pre-load/non-initialization component 134 determines whether the Number_of_Set_Ids has increased and the Number_of_Buckets remains unchanged. If so, processing continues to block 1152, otherwise, processing continues to block 1154. In block 1152, processing for case 1 is performed. Suppose the Number_of_Set_Ids is increased and the Number_of_Buckets did not change, then additional rows are inserted into the Result Sets Table of Contents 400, and the Number_of_Set_Ids in the Next Set Id table 200 is updated to the new number of set ids.

If the number of inserts into the Result Sets Table of Contents table 400 is beyond the number of rows that can be handled in one unit of work (e.g., a number of transactions to be performed to complete certain processing, such as inserting a specified number of rows), then the number of inserts is broken into multiple units of work, and commits are done after each unit of work. In certain implementations, the number of rows that can be handled in one unit of work is specified by a parameter in a properties file that controls how many inserts may be performed in one unit of work. In certain implementations, the number of transactions to be within one unit of work may be limited by the number of transactions a log file can record. After the tables 200 and 400 have been updated, the before files are deleted, which indicates that non-initialization processing has been completed for case 1.

In block 1154, the pre-load/non-initialization component 134 determines whether the Number_of_Set_Ids has decreased and the Number_of_Buckets remains unchanged. If so, processing continues to block 1156, otherwise, processing continues to block 1158. In block 1156, processing for case 2 is performed. The Set_Id and Bucket_Table in the Input Structure table 600 are mapped with the Current_Set_Id and Current_Bucket_Table in the Result Sets Table of Contents table 400. Suppose the Number_of_Set_Ids is decreased and the Number_of_Buckets did not change, then rows are deleted from the Result Sets Table of Contents table 400. The rows that are deleted from the Result Sets Table of Contents table 400 are added to the Deletion Structure table 700. Also, if the Set_Id of a deleted row is in the Input Structure table 600 for the same Bucket_Table and Created_Ts, then the row with that Set_Id is deleted from the Input Structure table 600.

In particular, in case 2, in which the Number_of_Set_Ids has decreased, the most current Number_of_Set_Ids remains in the Result Sets Table of Contents table 400. The Next_Set_Id is obtained from the Next Set Id table 200 and compared with the new Number_of_Set_Ids (before this new value is updated in the Next Set Id table 200), which will be the maximum number of Set Ids.

When the Next_Set_Id is compared with the new Number_of_Set_Ids, if the Next_Set_Id is equal to the new Number_of_Set_Ids, then all the rows having Set_Ids from the Next_Set_Id to the old Number_of_Set_Ids−1 are deleted from the Result Sets Table of Contents table 400, and rows whose Current_Set_Id is equal to the Set_Id of a deleted row are also deleted from the Input Structure table 600. The Set_Ids are added to the Deletion Structure table 700. The Next Set Id table 200 is updated by setting the Next_Set_Id to 0 and changing the Number_of_Set_Ids to the new Number_of_Set_Ids. Tables 400, 600, and 700 are changed for the same row in the same unit of work (i.e., with the same Set_Ids). If there are more rows than can be handled in one unit of work, then there may be more than one commit that is issued.

When the Next_Set_Id is compared with the new Number_of_Set_Ids, if the Next_Set_Id is less than the new Number_of_Set_Ids, then the Set_Ids which remain in the Next Set Id table 200 are 0 to Next_Set_Id−1, plus the old Number_of_Set_Ids−(new Number_of_Set_Ids−Next_Set_Id) to old Number_of_Set_Ids−1. The old Number_of_Set_Ids−(new Number_of_Set_Ids−Next_Set_Id) is given the value of Next_Set_Id, and the old Number_of_Set_Ids−1 is given the value of new Number_of_Set_Ids−1. For the Set_Ids that have changed, these Set_Ids are updated and the Bucket_Table column of the Result Sets Table of Contents table 400 is updated for these Set_Ids. The Set_Ids that are deleted from the Result Sets Table of Contents table 400 are moved to the Deletion Structure table 700, and these Set_Ids are removed from the Input Structure table 600. The Deletion Structure table 700 and Input Structure table 600 work off of the Current_Set_Id and the Current_Bucket_Table. After this has been done, the Number_of_Set_Ids in the Next Set Id table 200 is updated with the new Number_of_Set_Ids.

When the Next_Set_Id is compared with the new Number_of_Set_Ids, if the Next_Set_Id is greater than the new Number_of_Set_Ids, then the Set_Ids remaining in the Result Sets Table of Contents table 400 is determined as follows. The Set_Ids that remain are from Next_Set_Ids−new Number_of_Set_Ids to Next_Set_Ids−1. The remaining Set Ids values are mapped from 0 to new Number_of_Set_Ids−1, with their corresponding Bucket_Table value being recalculated based upon the modulo arithmetic that has already been described. The Set_Ids that are deleted from the Result Sets Table of Contents table 400 are placed in the Deletion Structure table 700 and are removed from the Input Structure table 600. The rows in these three tables 400, 600, and 700 are acted upon in a unit of work. If there are too many rows involved for one unit of work, then there may be more than one commit issued. After this has been done, then the Next_Set_Id is changed to 0, and the Number_of_Set_Ids in the Next Set Id table 200 is updated with the new Number_Of_Set_Ids.

In block 1158, the pre-load/non-initialization component 134 determines whether the Number_of_Buckets has decreased and the Number_of_Set_Ids remains unchanged. If so, processing continues to block 1160, otherwise, processing continues to block 1162. In block 1160, processing for case 3 is performed. That is, if the Number_of_Buckets is being decreased (based upon processing by implementations of the invention or due to actions by a system administrator) in the Buckets Definition table 300, then the Bucket_table column in the Result Sets Table of Contents table 400 is recalculated for each Set_Id, using the modulo arithmetic which has been described before. The Bucket tables that are to be deleted are added to the Drop Bucket table 800, and these bucket tables are dropped when there is no data in them. After this has been completed, the Number_of_Buckets in the Buckets table 300 is updated with the new Number_of_Buckets.

In block 1162, the pre-load/non-initialization component 134 determines whether the Number_of_Buckets has increased and the Number_of_Set_Ids remains unchanged. If so, processing continues to block 1164, otherwise, processing continues to block 1166. In block 1164, processing for case 4 is performed. In particular, if the Number_of_Buckets is being increased (based upon processing by implementations of the invention or due to actions by a system administrator) in the Buckets table 300, then the Bucket_table column in the Result Sets Table of Contents table 400 is recalculated for each Set_Id using the modulo arithmetic which has been described before. Before creating a new bucket table, the pre-load/non-initialization component 134 determines whether the Bucket table is listed in the Drop Bucket table 800. If so, then the bucket table is deleted from the Drop Bucket table 800, and the bucket table is not created, as the bucket table already exists as a Bucket table. Otherwise, the new bucket table is created (with the Bucket prefix and an updated Bucket_Table value). For example, if Number_of_Buckets increases from 5 to 7, then, two new Bucket tables are created, such as "Bucket6" and "Bucket7". After this has been completed, then the Number_of_Buckets in the Buckets Definition table 300 is updated with the new Number_of_Buckets.

In block 1166, the pre-load/non-initialization component 134 determines whether the Number_of_Set_Ids has increased and the Number_of_Buckets has decreased. If so, processing continues to block 1168, otherwise, processing continues to block 1170. In block 1168, processing for case 5 is performed. Suppose Number_of_Set_Ids is being increased and the Number_of_Buckets is being decreased, then, the processing of case 3 is applied to the already existing Set_Ids, and then, the processing of case 1 is applied to these Set_Ids, using the new Number_of_Buckets to determine which Bucket table a Set_Id belongs to.

In block 1170, the pre-load/non-initialization component 134 determines whether the Number_of_Set_Ids has increased and the Number_of_Buckets has increased. If so, processing continues to block 1172, otherwise, processing continues to block 1174. In block 1172, processing for case 6 is performed. Suppose Number_of_Set_Ids is being increased and the Number_of_Buckets is being increased. Then, the processing of case 4 is applied to the already existing Set_Ids, and then the processing of case 1 is applied to these Set_Ids, using the new Number_of_Buckets to determine which Bucket table a Set_Id belongs to.

In block 1174, the pre-load/non-initialization component 134 determines whether the Number_of_Set_Ids has decreased and the Number_of_Buckets has decreased. If so, processing continues to block 1176, otherwise, processing continues to block 1178. In block 1176, processing for case 7 is performed. Suppose Number_of_Set_Ids is being decreased and the Number_of_Buckets is being decreased. The processing of case 2 is applied to the existing Set_Ids, and then, the processing of case 3 is applied to these Set_Ids.

In block 1178, the pre-load/non-initialization component 134 determines whether the Number_of_Set_Ids has decreased and the Number_of_Buckets has increased. If so, processing continues to block 1180, otherwise, processing continues to block 1182. In block 1180, processing for case 8 is performed. Suppose Number_of_Set_Ids is being decreased and the Number_of_Buckets is being increased. The processing of case 2 is applied to the existing Set_Ids, and then, the processing of case 4 is applied to these Set_Ids.

In block 1182, the Next Set Id table 200 and the Buckets Definition table 300 are updated, and the before files are deleted, if this processing has not already been performed by the specific case processing (blocks 1152, 1156, 1160, 1164, 1168, 1172, 1176, or 1180).

Figure 12:
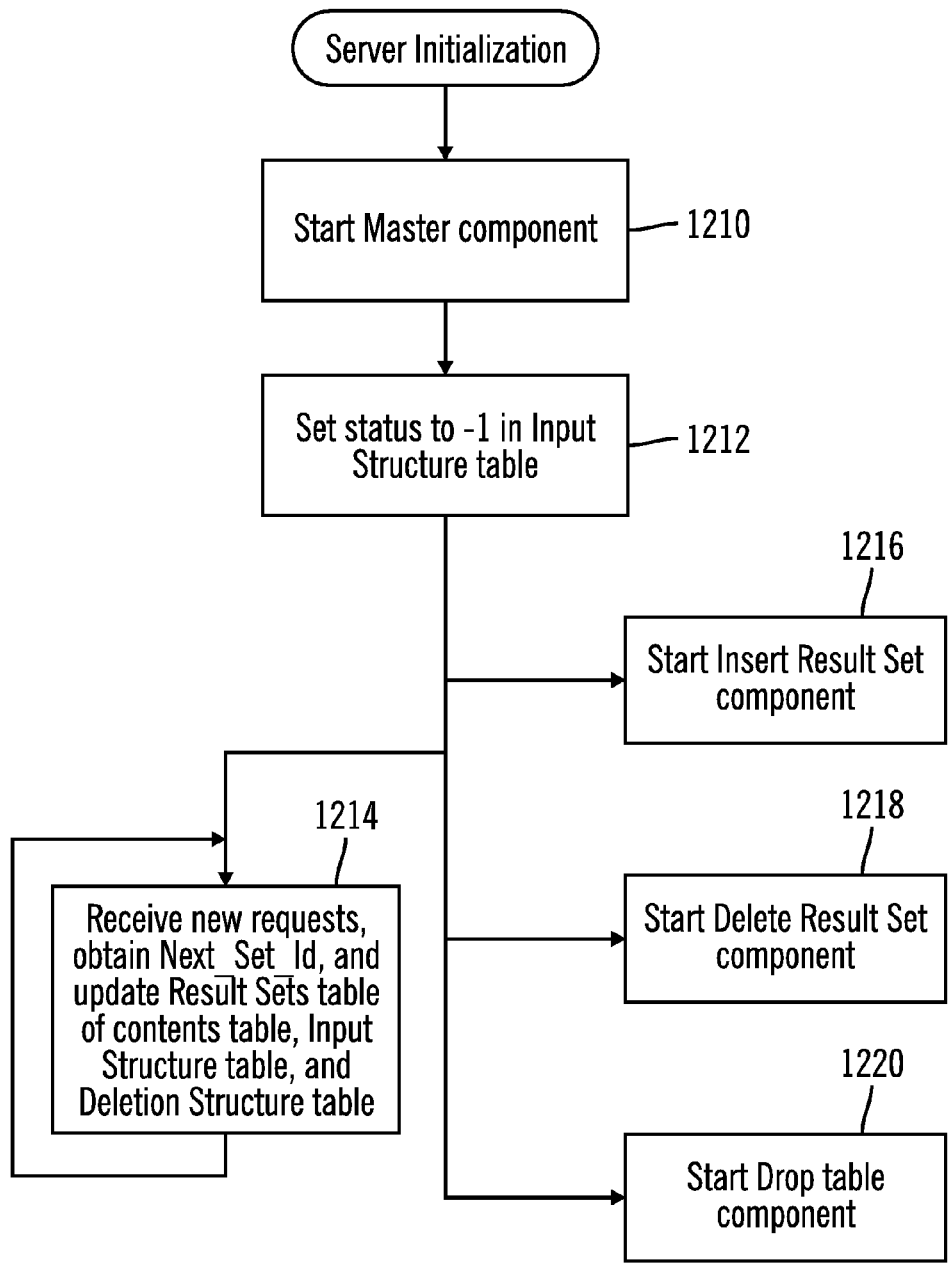
FIG. 12 illustrates logic implemented in a master component for server initialization in accordance with certain implementations of the invention.

FIG. 12 illustrates logic implemented in the master component 136 for server initialization in accordance with certain implementations of the invention. This logic describes server operations to manage result sets. The initialization parameters for the server computer 120 consist of a maximum number of connections to use for insertion, a maximum number of connections to use for deletion, a number of connections for other processes (at most 4 in certain implementations), a maximum number of rows that can be inserted in one unit of work, a maximum number of rows that can be deleted in one unit of work, a maximum number of rows that can be updated in one unit of work, when deletions and drop tables are to be done, and how many days of statistics are to be maintained. The userids and encrypted passwords of the server computer 120 running under a user are also contained in the initialization parameters for connecting to the data store 170, in addition to the data store name. The server computer 120 supplies userids and passwords to access the data store 170.

Control begins at block 1210 with the master component 136 starting up when the server computer 120 starts. In block 1212, the master component 136 sets a status to a first value (e.g., −1) in the Input Structure table 600 for each row to identify rows that are to be worked on from the beginning (e.g., start processing these rows understanding that no processing was previously performed on these rows). The master component 136 updates the status by performing an update based upon the position of a cursor and moves to the next row in a loop. If the number of rows exceeds the maximum number of rows that can be updated, then a commit is performed. The master component 136 continues initializing the Input Structure table 600 until all rows that do not have a status of a first value (e.g., −1) are set to the first value (e.g., −1).

In block 1214, the master component 136 receives new requests, obtains a Next_Set_Id, and updates the Result Sets Table of Contents table 400, the Input Structure table 600, and the Deletion Structure table 700. In particular, the server computer 120 consists of a master component 136 that receives queries for which a result set is created. The query may be transmitted in, for example, two forms. One form is in a format that is entered by a user and that describes how the initial query was entered (e.g., this initial query may be transformed to a query that can be executed), and the other form is the actual query that is run to produce the result.

For example, the master component 136 receives a new request and retrieves the Next_Set_Id from the Next Set Id table 200 and uses this as the Set_Id that is placed in the Result Sets Table of Contents table 400. Before placing the Next_Set_Id back into the Next Set Id table 200, the master component 136 increments the Next_Set_Id by 1 and compares this incremented Next_Set_Id to the Number_of_Set_Ids in the Next Set Id table 200. If the incremented Next_Set_Id is less than the Number_of_Set_Ids, then the master component 136 updates the Next_Set_Id in the Next Set Id table 200 with this new value. Otherwise, the Next_Set_Id is set to 0 in the Next Set Id table 200.

Also, the Number_of_Buckets and Bucket_Prefix are retrieved at the startup of the master component 136 from the Buckets Definition table 300. Using modulo arithmetic, the master component 136 determines the Bucket table into which the result set will be stored. The actual bucket table is the Bucket_Prefix concatenated with the remainder of the Set_Id divided by the Number_of_Buckets. Before placing the information into the Result Sets Table of Contents table 400 for the new Set_Id (i.e., the retrieved Next_Set_Id), current information is retrieved for Set_Id (which is the value of Current_Set_Id), current information is retrieved for Bucket_Table (which is the value of Current_Bucket_Table), Created_Ts, and Set_Count, and this data is placed in the Deletion Structure table 700.

After this, information is placed into a row of the Result Sets Table of Contents table 400 for the new Set_Id. The Set_Id and the Current_Set_Id are set equal to the new Set_Id. The Bucket_Table and Current_Bucket_Table are set equal to the new Bucket_Table (which has been calculated). Owned_By is set to the user who is creating this result set. Set_Name is set to S concatenated with the Set_Id. Set_Description is set to the first few characters of the query. Created_Ts is set to the Current Timestamp. The Query stores the query (e.g., a query Extensible Markup Language (XML) object). Set_Count is set to 0, and the Saved_Complete_Flag is set to the second value (e.g., 0).

A row is inserted into the Input Structure table 600 with the Set_Id, Bucket_Table and Created_Ts that have been updated in the Result Sets Table of Contents table 400, and the Status is set to a first value (e.g., −1). Obtaining the Set_Id and storing the next Set_Id back in the Next Set Id table 200 may be done as an atomic operation with an exclusive lock being held until this has completed successfully. The other tables may be changed in a single unit of work.

In block 1216, the master component 136 starts up the insert result set component 138. In block 1218, the master component 136 starts up the delete result set component 140. In block 1220, the master component 136 starts up the drop table component 142. The processing of blocks 1214, 1216, 1218, and 1220 may be performed by the master component 134 concurrently.

Figure 13A:
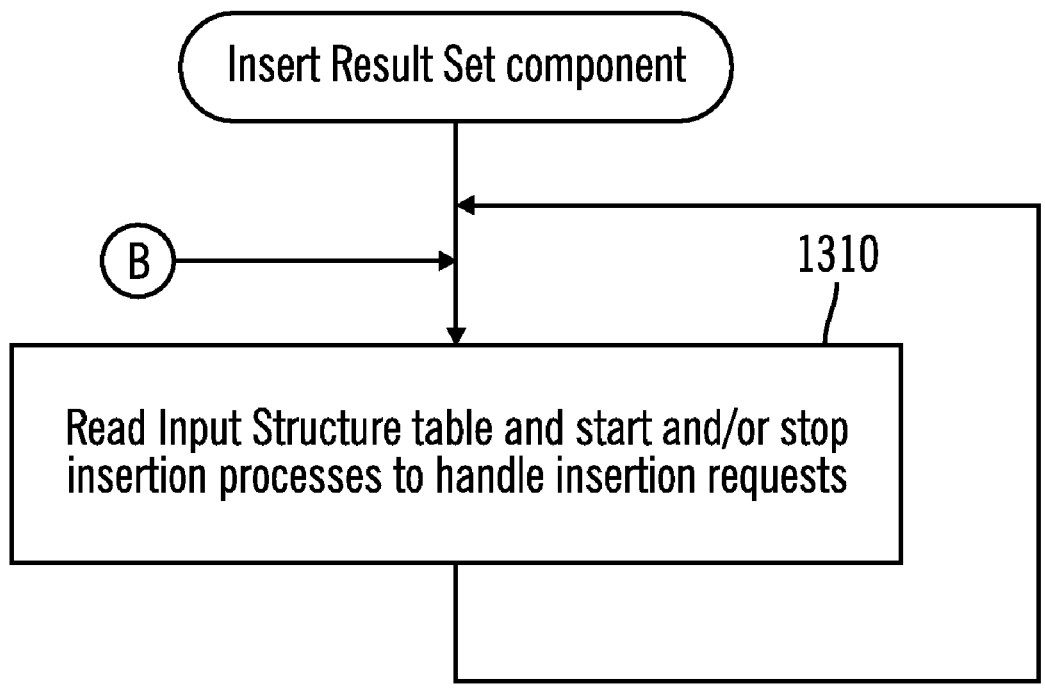
FIGS. 13A, 13B, and 13C illustrates logic implemented in an insert result set component and in insertion processes in accordance with certain implementations of the invention.
Figure 13B:
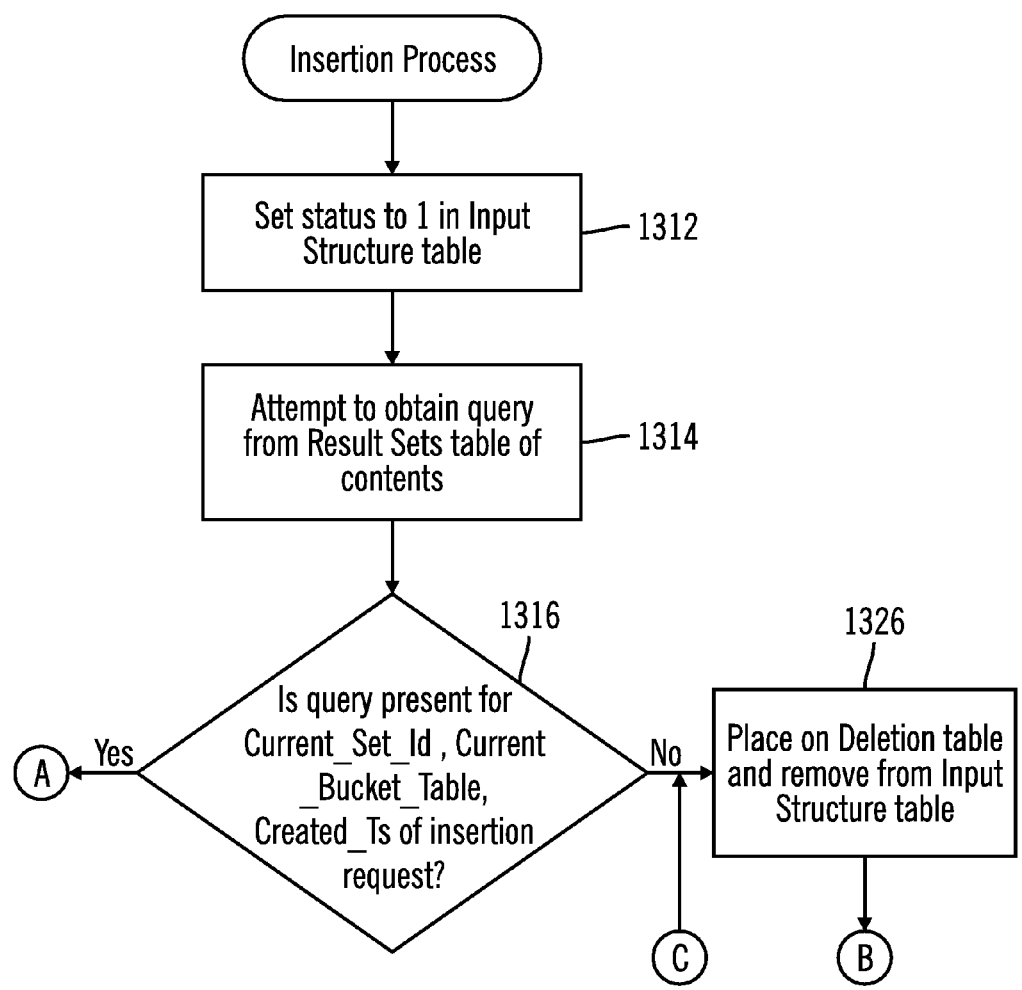
Figure 13C:
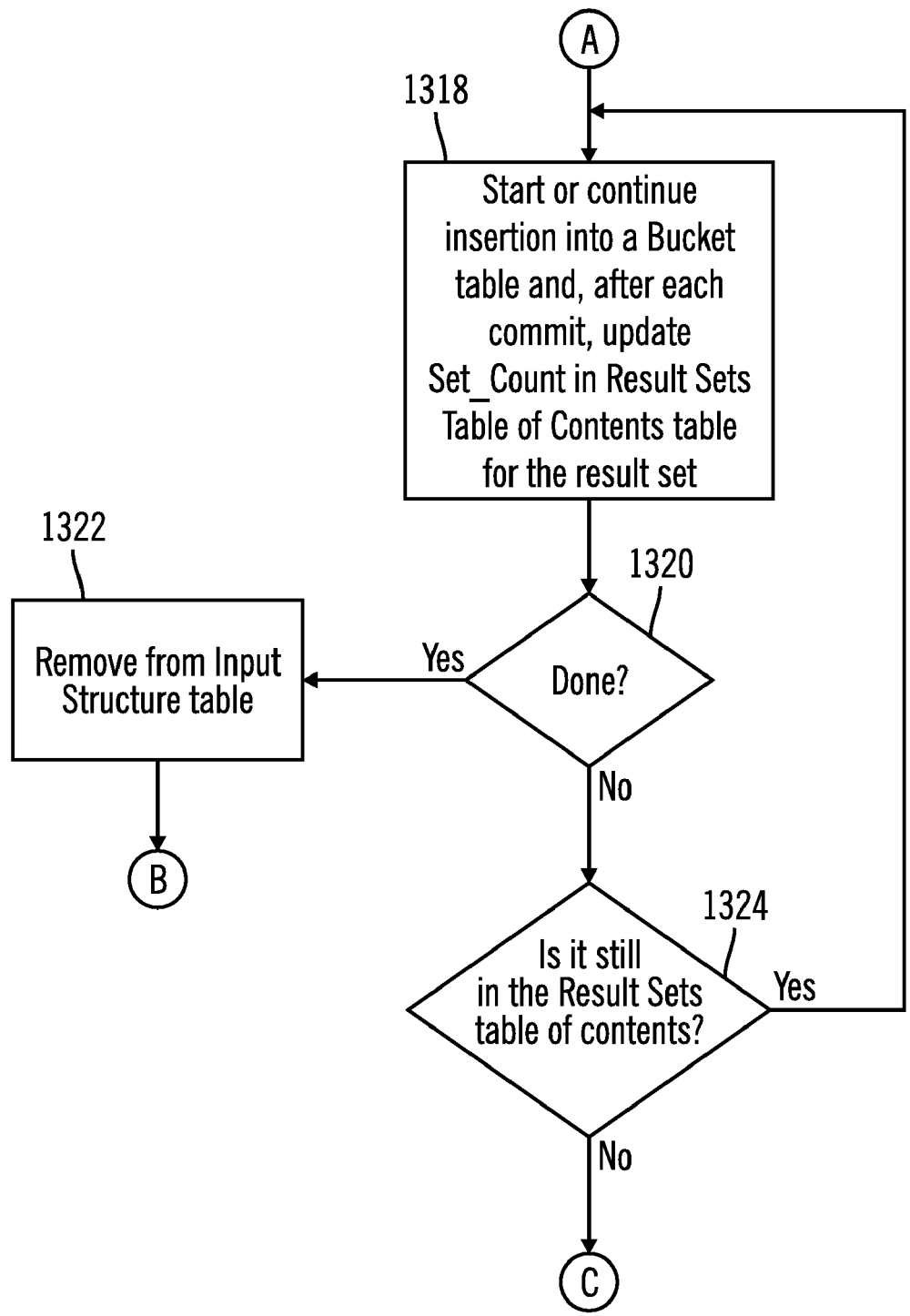

FIGS. 13A, 13B, and 13C illustrates logic implemented in the insert result set component 138 and in insertion processes spawned by the insert result set component 138 in accordance with certain implementations of the invention. The insert result set component 138 sets up the insertion connection pool by using the maximum number of connections to use for insertion. In block 1310, the insert result set component 138 reads the Input Structure table 600 for information on which insertion processes are to be started to perform insertions and starts and/or stops insertion processes to handle insertion requests. For example, if there are 10 insertion requests, then 10 insertion processes may be started. If there are more insertion requests than there are connections, then these additional insertion requests remain to be handled by the insertion processes. An insertion process is started by the insert result set component 138 to handle one insertion request. Once an insertion process completes, then the insert result set component 138 will either end the insertion process if no other insertion requests remain to be handled and return the connection to a connection pool for this insertion process or the insert result set component 138 will give the insertion process another insertion request to handle. The insertion result set component 138 continues to start and/or stop insertion processes until termination (e.g., when the result set manager 132 is terminated).

In block 1312, a started insertion process first changes the Status to a second value (e.g., 1) in the Input Structure table 600 for the insertion request it is working on based upon the Set_Id, Bucket_Table, and Created_Ts of the insertion request. Then, (block 1314) the insertion process attempts to obtain the actual query to run from the Result Sets Table of Contents table 400. In block 1316, the insertion process determines whether a query is present in the Result Sets Table of Contents table 400 for which the Current_Set_Id is equal to the Set_Id of the insertion request, the Current_Bucket_Table is equal to Bucket_Table of the insertion request, and Created_Ts is equal to the Created_Ts of the insertion request. If so, processing continues to block 1318, otherwise, processing continues to block 1326. In block 1326, since no row was found, then the row corresponding to the insertion request is placed on the Deletion Structure table 700 and removed from the Input Structure table 600. After this is done, the insertion process informs the insert result set component it has completed the insertion request, and the insert result set component 138 either ends the insertion process or gives the insertion process another request to handle.

In block 1318, the insertion process starts or continues insertion into a bucket table and, after each commit, updates Set_Count in the Result Sets Table of Contents table 400 for the result set. The insertion process may break up a unit of work into multiple units of work, perform a commit after one unit of work, then "continues" with another unit of work. After the Query column is retrieved from the Result Sets Table of Contents table 400, then the insertion process pulls the actual query to be executed from the Query that was returned and retrieves the Key values that are to be inserted into the Bucket_Table for the Set_Id and Created_Ts for the insertion request in the Input Structure table 600.

Before performing any insertions, the insertion process determines whether any data is in the Bucket table 500 for this insertion request. If there is, then the insertion process deletes this information. Additionally, before performing any insertion, the insertion process also determines how many rows are to be inserted. If the number of rows to be inserted are less than or equal to the maximum number of rows that can be inserted in one unit of work, then a single insert is performed using, for example, an insert select construct followed by a commit if the select statement used in the insert is not using Common Table Expression (CTE) format. A CTE format is one way of structuring a query. If the single insert fails, then a rollback is performed and the values may be inserted by using a block of inserts. Otherwise, the inserts may be constructed in a loop by using a set of key values in a select statement for the single insert based upon retrieving the number of key values from the first select and moving these onto an insert select construct followed by a commit in the loop. The commit point for the insert is based upon the maximum number of rows to be inserted or, if the number of rows to be inserted is less than the maximum, then the commit is performed.

If a block insert fails, then a rollback is performed, the Set_Count is set back to 0, any data in the Bucket Table 500 for this result set is removed, and the data is then obtained by going back to the first position of the select, since the cursor is scrollable and retrieves at most 100 values at a time, which are then used to create an insert select statement. A commit is performed after each of these inserts. If this should fail, then this is noted in a log so that it may be processed later (e.g., by a system administrator). In the loop, the Result Sets Table of Contents table 400 is updated for the Set_Count column for the given Current_Set_Id, Current_Bucket_Table and Created_Ts.

In block 1320, the insertion process determines whether it is done. If so, processing continues to block 1322, otherwise, processing continues to block 1324. In block 1322, the insertion request is removed from the Input Structure table 600. Also, when the insertion operation has completed, the Saved_Complete_Flag is set to the first value (e.g., 1) by the insertion process. When an insertion request is moved from the Input Structure table 600 to the Deletion Structure table 700, the number of rows that have been inserted for this request into a Bucket table 500 is obtained and placed in a row that is placed in the Deletion Structure table 700. If the row already exists in the Deletion Structure table 700, then the insertion request is removed from the Input Structure table 600 and not placed in the Deletion Structure table 700.

In block 1324, the insertion process determines whether the insertion request is still in the Result Sets Table of Contents table 400. If so, processing returns to block 1318. Otherwise, if the insertion request is not found in the Result Sets Table of Contents table 400, then the insertion process moves the insertion request to the Deletion Structure table 700, removes the insertion request from the Input Structure table 600, and informs the insert result set component 138 that it has completed the insertion request. The Set_Count is updated in the Result Sets Table of Contents table 400 with the count of how many rows belong to this result set.

Upon receiving a notification from an insertion process, the insert result set component 138 goes back to read the Input Structure table 600 to determine whether there are more insertion requests to handle and, if there are more insertion requests to handle, gives out an insertion request to the insertion process.

Figure 14A:
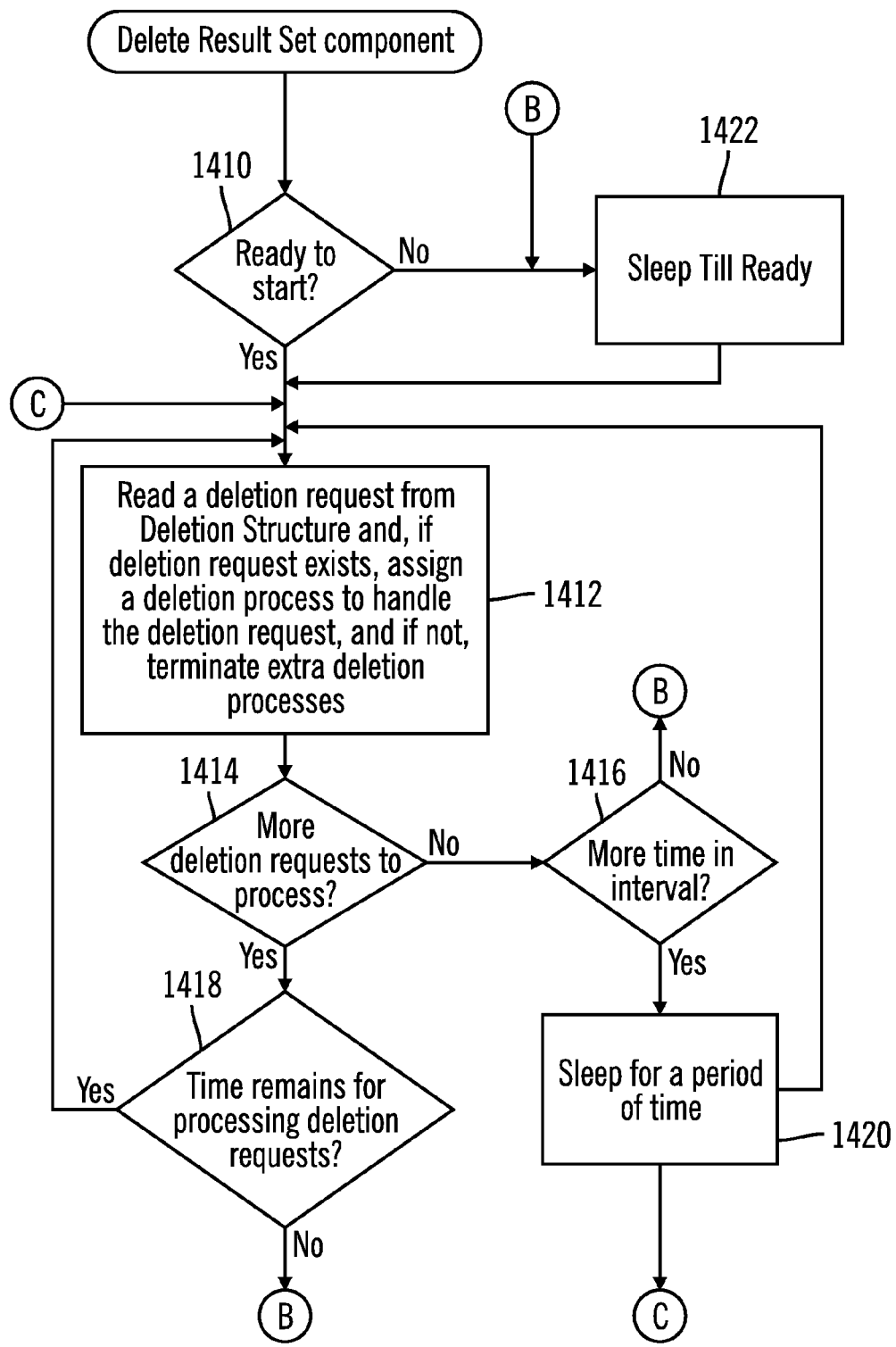
FIGS. 14A and 14B illustrate logic implemented in a delete result set component 140 and in deletion processes spawned by the delete result set component in accordance with certain implementations of the invention.
Figure 14B:
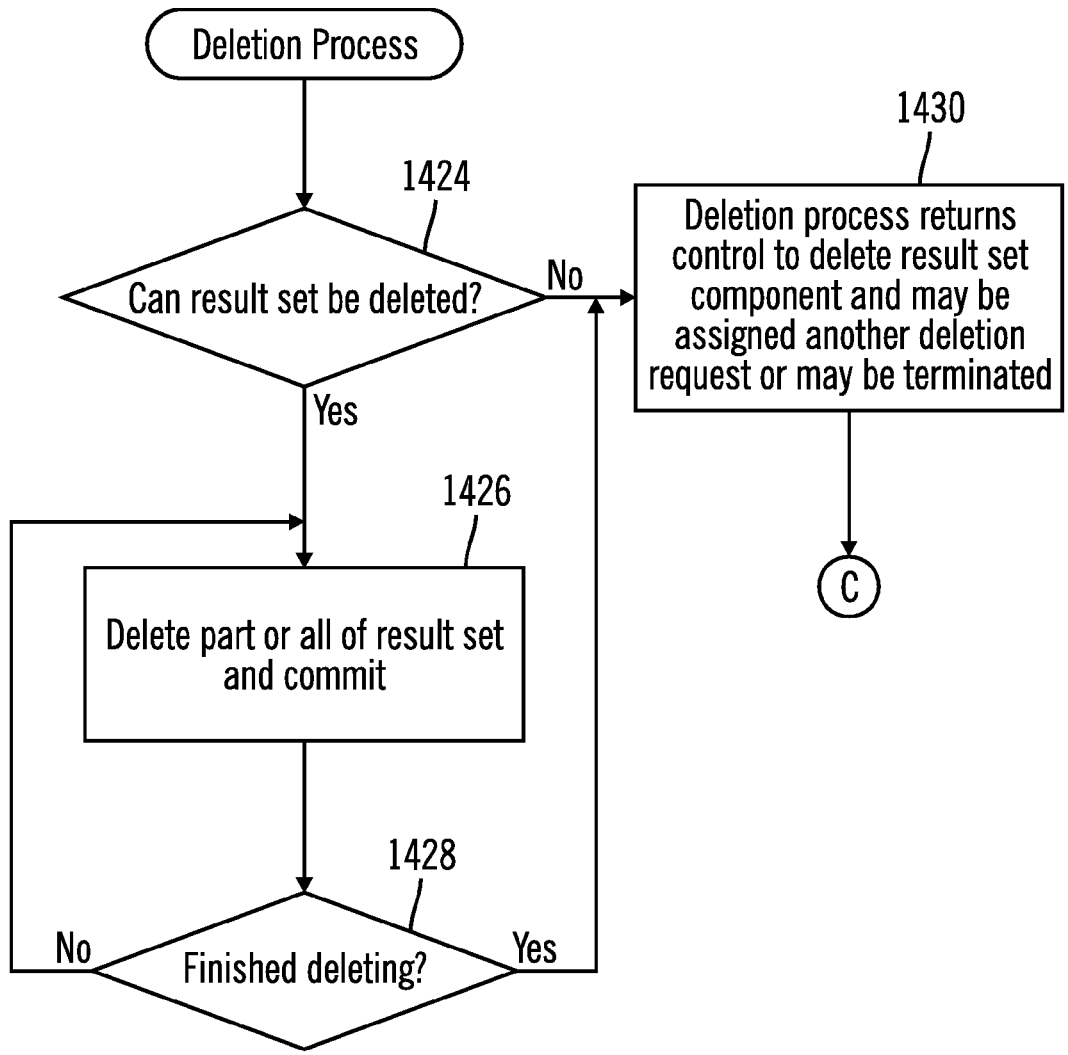

FIGS. 14A and 14B illustrate logic implemented in a delete result set component 140 and in deletion processes spawned by the delete result set component 140 in accordance with certain implementations of the invention. In block 1410, the delete result set component 140 determines whether it is ready to start. If so, processing continues to block 1412, otherwise, processing continues to block 1422. In block 1422, the delete result set component 140 sleeps till it is ready to start. In certain implementations, the delete result set component 140 sleeps until it has to start working based upon one or more parameter(s) that indicate when the delete result set component 140 should run.

The delete result set component 140 reads deletion requests from the Deletion Structure table 700 to determine which result sets are to be deleted and starts and/or stops deletion processes to handle deletion requests until the Deletion Structure table 700 has been read completely or the end of the interval of time for deletions is reached. The delete result set component 140 reads the Statistics table 900 to figure out how many deletion processes should be started to handle the deletion requests based upon how many rows need to be deleted. The delete result set component 140 also records statistics in Statistics table 900 based upon how deletions are completed by deletion processes once the delete result set component 140 has collected the information for an interval of time. This allows the delete result set component 140 to dynamically determine how many processes should be started up, with the restriction being the maximum number of connections available for deletion. The delete result set component creates a connection pool for this purpose and keeps track of how many connections are in use at any time to balance the deletion process during the time interval for deletion.

In block 1412, the delete result set component 140 reads a deletion request and, if a deletion request exists, a deletion process is assigned to handle the deletion request. The deletion process that is assigned may be newly started by the delete result set component 140 or may be a deletion process that has completed processing another deletion request. In block 1412, if a deletion request does not exist, the delete result set component 140 may terminate extra deletion processes that do not have deletion requests to process.

In block 1414, if there are more deletion requests to process from the Deletion Structure table 700, processing continues to block 1418, otherwise, processing continues to block 1416. In block 1418, if time remains for processing deletion requests in the interval, processing continues to block 1412, otherwise, processing continues to block 1422. In block 1416, if there is more time in the interval, processing continues to block 1420, otherwise, processing continues to block 1422. In block 1420, the delete result set component 140 sleeps for a period of time (e.g., one minute) and processing returns to block 1412 to start one or more deletion processes.

In block 1424, once a deletion process is started to perform the deletion of a result set, the deletion process determines whether the result set can be deleted. If so, processing continues to block 1426, otherwise, processing continues to block 1430. In block 1430, the deletion process returns control to the delete result set component 140, and the deletion process may be assigned a new deletion request or may be terminated. In particular, the deletion process determines whether the deletion request is in the Input Structure table 600. If the deletion request is in the Input Structure table 600, then this deletion request is skipped, and the deletion process returns control to the delete result set component 140, which either gives the next request to this deletion process or terminates the deletion process when all other deletion requests are being handled by other deletion processes (block 1412).

In block 1426, the deletion process deletes part or all of the result set and commits. In particular, if the result set to be deleted is not in Input Structure table 600, then the deletion process goes to a Bucket table 500 to determine how many rows are in the Bucket table 500 for the result set that is to be deleted. The deletion process determines whether the delete can be done with a single delete based upon the maximum number of rows that can be deleted in a unit of work. If the delete can be done with a single delete for the Set_Id and Created_Ts in the given Bucket_Table, then a commit is done after this delete, and this deletion request is removed from the Deletion Structure table 700.

Otherwise, a select is performed against a Bucket table 500 for the given Set_Id and Created_Ts. The Keys are retrieved in a loop. If the number of Keys is equal to the maximum number of rows that can be deleted in one unit of work, then they are deleted with one delete using the key values to delete these rows, and then more Keys are retrieved for the result set. If the end of data is reached and the number of keys retrieved is less than or equal to the maximum number of rows that can be deleted in one unit of work, then they are deleted.

If the delete can not be done using the maximum number of rows, since the number of rows to be deleted is too large, then the delete is done in groups of at most 100 records at a time followed by a commit. If this should fail, then this is noted in a log so that it may be processed later (e.g., by a system administrator).

In block 1428, after a commit, the deletion process determines whether deletion for the deletion request is finished. If so, processing continues to block 1430, otherwise, processing returns to block 1426. After all the requested rows of the result set are deleted, the deletion request is removed from the Deletion Structure table 700, and the delete result set component 140 is informed that the deletion has been completed.

At this point, the delete result set component 140 either terminates this deletion process or gives the deletion process another request if the delete result set component 140 determines that there are more deletion requests to be processed in the deletion interval and this deletion process is needed to handle the operation based upon the statistical information which is gathered and stored in the Statistics table 900. The delete result set component 140 goes back to read the Deletion Structure table 700 to determine whether there are more deletion requests to handle so that the delete result set component 140 can calculate how many processes need to be used based upon the statistics for the number of records to be deleted in a given time interval and the maximum number of processes which can be used from its connection pool.

Figure 15A:
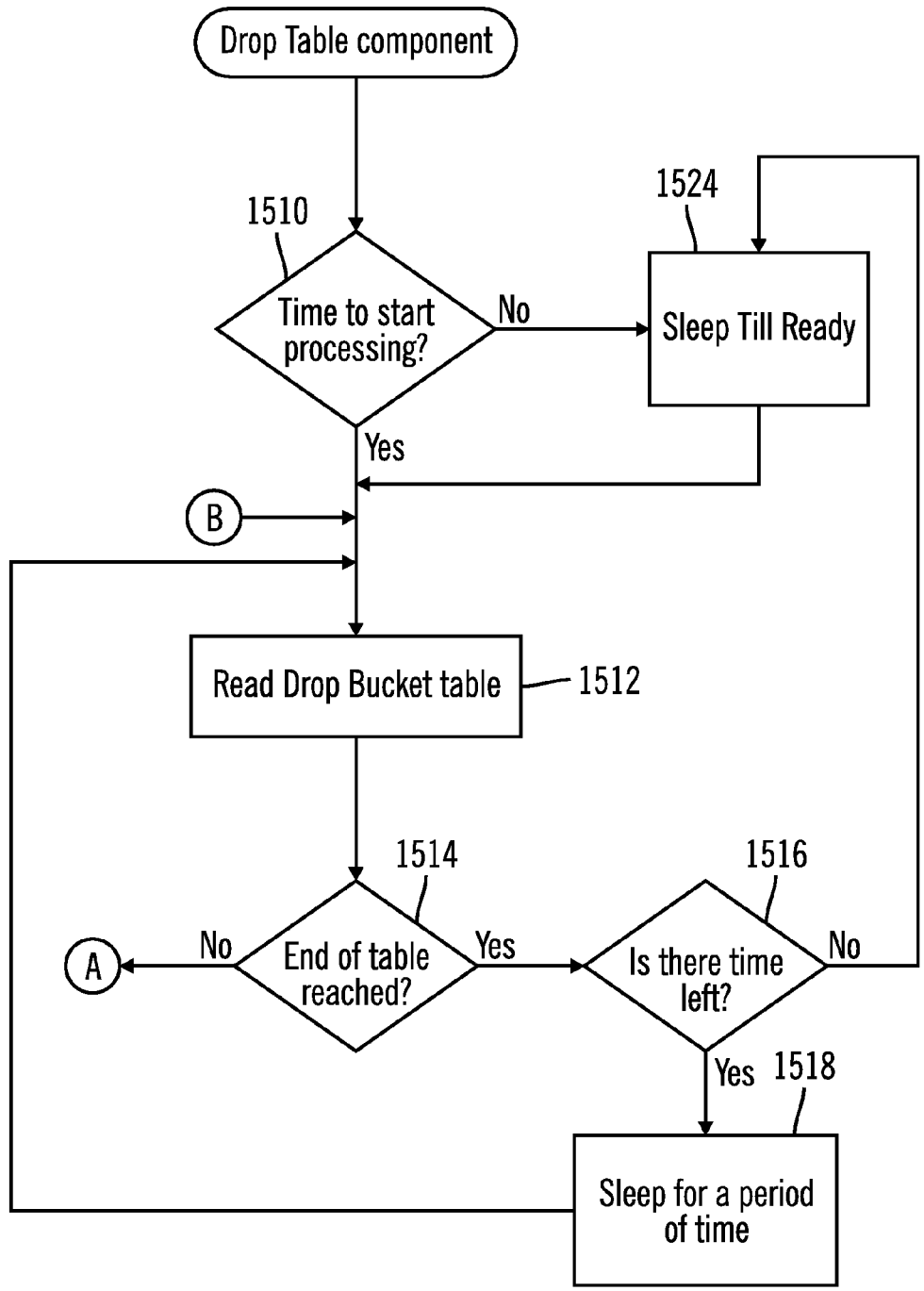
FIGS. 15A and 15B illustrate logic implemented in a drop table component in accordance with certain implementations of the invention.
Figure 15B:
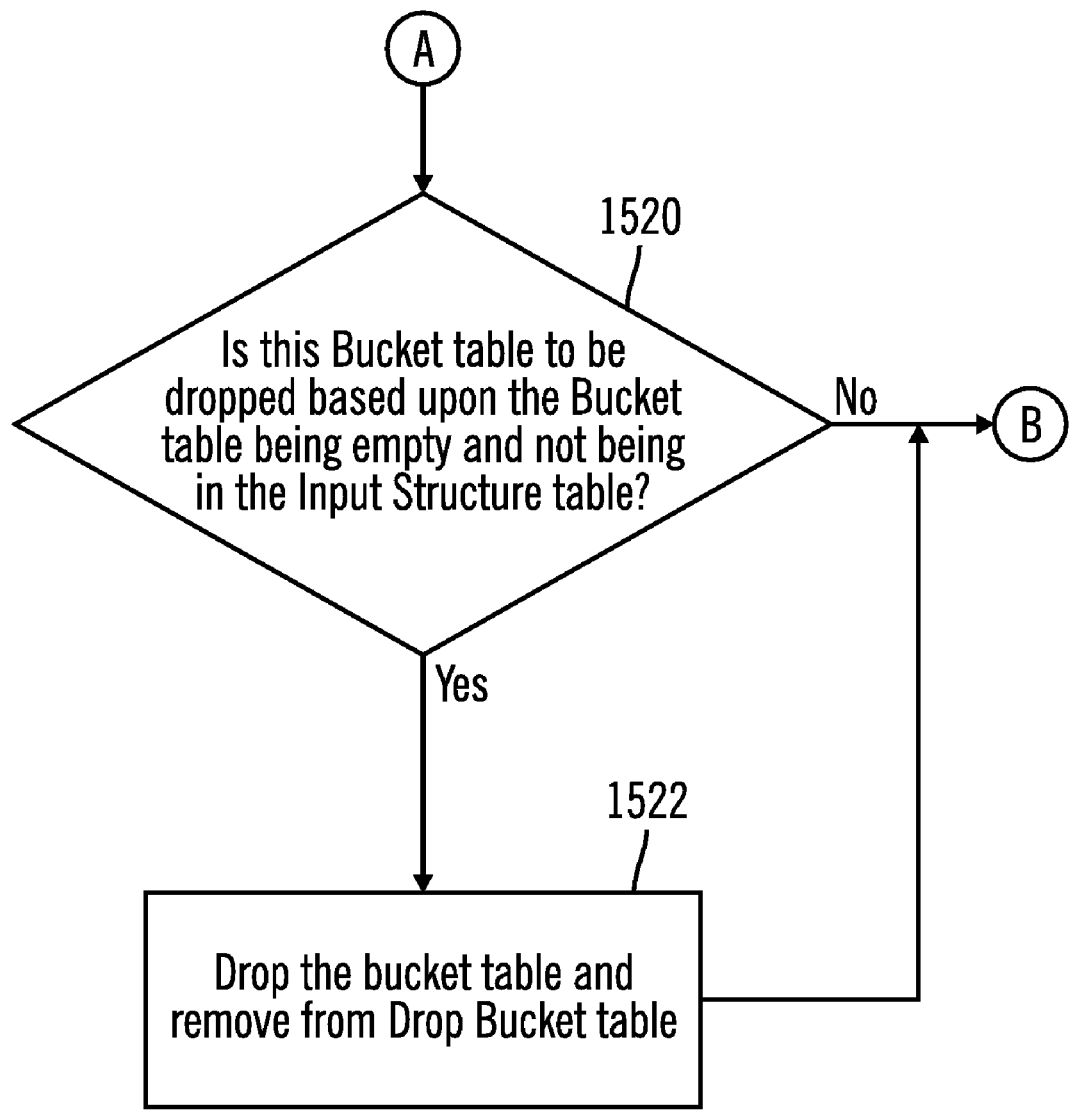

FIGS. 15A and 15B illustrate logic implemented in the drop table component 142 in accordance with certain implementations of the invention. In block 1510, the drop table component 142 determines whether it is time to start processing. If so, processing continues to block 1512, otherwise, processing continues to block 1524. In block 1524, the drop table component 142 sleeps till ready. In certain implementations, the drop table component 142 sleeps until it has to start working based upon one or more parameter(s) that indicate when the drop table component 142 should run.

In block 1512, the drop table component 142 reads the Drop Bucket table 800 to determine which tables are to be dropped, one by one. In block 1514, the drop table component 142 determines whether the end of table is reached. If so, processing continues to block 1516, otherwise, processing continues to block 1520 to continue dropping tables. In block 1516, the drop table component 142 determines whether there is time left in the interval. If so, processing continues to block 1518, otherwise, processing continues to block 1524. In block 1518, the drop table component 142 sleeps for a period of time (e.g., one minute) and continues to block 1512. For example, the Drop Bucket table 800 may be empty, so the drop table component 142 sleeps during the interval, and, upon waking up, rechecks whether any rows have been added to the Drop Bucket table 800 for processing.

In block 1520, before dropping a table, the drop table component 142 finds out whether the bucket table is empty by counting the number of rows in the Bucket table 500 and finds out whether there are inserts to be performed by the Input Structure table 600 by counting the number of rows in the Input Structure table 600 that list the Bucket_Table which is to be dropped. If both queries result in the value of 0, then processing continues to block 1522, otherwise, processing continues to block 1512. In block 1522, the table is dropped, and the row that says to drop this table is removed from the Drop Bucket table 800.

In certain implementations, the drop table component 142 has one connection to the data store 170 and performs everything directly without any subprocesses. The drop table component 142 runs based upon when drop tables are to be performed.

In certain implementations of the invention, the Result Sets Table of Contents table 400 allows retrieval of the rows of a result set either by using a query if the result set is not completely built or by using the bucket table joined with other tables in the system using Key values as the join mechanism for visualizing the results. This is a mechanism for looking at different points in time with content (e.g., rows) changing. Also, to see the content (e.g., rows) of a result set before it is completely built, a value in the system may be set to obtain this content.

In particular, when the result of a query is saved in a bucket table, the result set is identified by a set id, a timestamp, and the unique keys of the records in the result set. Using the unique keys for a set id, it is possible to reconstitute a point in time result without reissuing the initial query that created the result. When the set id is reused, the previous result is placed in a deletion queue to be deleted. The query that created the result set is also saved so that the query can be rerun to see what the result would look like at a later time than the original execution time of the query (e.g., against a database that has potentially changed since the last time the query was executed). For example, in a library system a user may want to look at results that do not have data in them after a certain date, and the saved result set allows this. The saved result set decreases the search and operating domain.

For the following example, there is a result set with a Set_Id of "n" in a Bucket table "Rsm". The result set with the Set_Id of "n" has a Created_Ts of "yyyy-mm-dd-hh:mm:ss:ffffff", and the data which forms this result set is associated with table "Table1", which has columns "a", "b", and "c". The following sample query (1) provides point-in-time data from Bucket table "Rsm", without executing the original query that created the result set having the Set_Id of "n".

SELECT Rsm.Key,b,c Query (1)
FROM Rsm, Table1
WHERE Rsm.Created_Ts='yyyy-mm-dd-hh:mm:ss:ffffff'
and Rsm.Set_d=n and Rsm.Key=Table1.a Sample query (1) retrieves results that are based upon the result set having the Set_Id of "n" and does not introduce additional rows since the result set was created by executing the original query. Therefore, the results of query (1) may be missing some rows that may have been added to table "Table1" or some rows that were deleted from table "Table1" since the original query was run.

Sample query (2) retrieves all the rows in the result set including the rows that have no values in the system any longer:

SELECT Rsm.Key,b,c Query (2)
FROM Rsm left join Table1 on Rsm.Key=Table1.a
WHERE Rsm.Created_Ts='yyyy-mm-dd-hh:mm:ss:ffffff'
and Rsm.Set_Id=n Sample query (3) retrieves rows that have been added to Table1 since the result set was created:

SELECT a,b,c Query (3)
FROM Table1
where Table1.a not exists (select * from Rsm where Rsm.Key=Table1.a and Rsm.Created_Ts='yyyy-mm-dd-hh:mm:ss:ffffff' and Rsm.Set_Id=n)

Sample queries (1), (2), and (3) represent just a few of the uses of a saved result set, and many other types of queries may be performed on the saved result set.

Thus, implementations of the invention allow one to refine queries against the result set and drill into information for further details without going back to the starting point. When the number of result sets is changed and/or the number of bucket tables are changed there is no movement of the result set content, and, therefore, processing is performed via a mapping mechanism. Therefore, the retrieval of information is quick.

Additional Implementation Details

The described techniques for result set management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 10, 11A-C, 12, 13A-C, 14A-B, and 15A-B describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 10, 11A-C, 12, 13A-C, 14A-B, and 15A-B may be implemented in software, hardware, programmable and non-programmable gate array logic or in some combination of hardware, software, or gate array logic.

Figure 16:
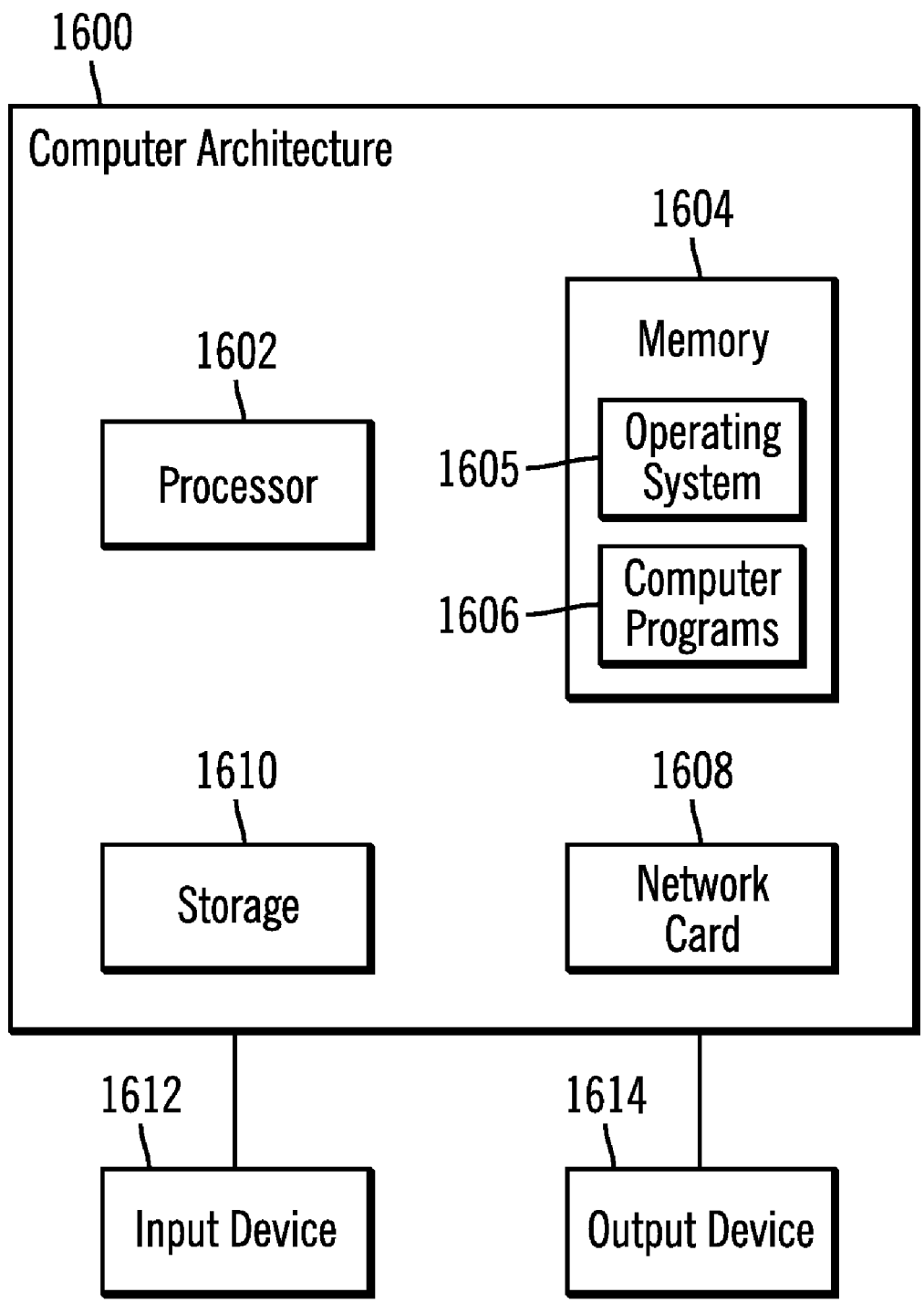
FIG. 16 illustrates an architecture of a computer system that may be used in accordance with certain implementations of the invention.

FIG. 16 illustrates an architecture of a computer system that may be used in accordance with certain implementations of the invention. Computers 100 and/or 120 and/or 180 may implement computer architecture 1600. The computer architecture 1600 may implement a processor 1602 (e.g., a microprocessor), a memory 1604 (e.g., a volatile memory device), and storage 1610 (e.g., a non-volatile storage area, such as magnetic disk drives, optical disk drives, a tape drive, etc.). An operating system 1605 may execute in memory 1604. The storage 1610 may comprise an internal storage device or an attached or network accessible storage. Computer programs 1606 in storage 1610 may be loaded into the memory 1604 and executed by the processor 1602 in a manner known in the art. The architecture further includes a network card 1608 to enable communication with a network. An input device 1612 is used to provide user input to the processor 1602, and may include a keyboard, mouse, pen-stylus, microphone, touch sensitive display screen, or any other activation or input mechanism known in the art. An output device 1614 is capable of rendering information from the processor 1602, or other component, such as a display monitor, printer, storage, etc. The computer architecture 1600 of the computer systems may include fewer components than illustrated, additional components not illustrated herein, or some combination of the components illustrated and additional components.

The computer architecture 1600 may comprise any computing device known in the art, such as a mainframe, server, personal computer, workstation, laptop, handheld computer, telephony device, network appliance, virtualization device, storage controller, etc. Any processor 1602 and operating system 1605 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A system for result set management, comprising:
a processor;
means for receiving input from a system administrator of a number of result sets that are to be stored and a number of bucket tables that are to hold the result sets, wherein the number of result sets represents how many result sets are to be stored, and wherein the number of bucket tables represents how many bucket tables are to be stored in a database;
means for initializing a result sets table of contents that includes a row for each existing result set, a bucket table column, and a set identifier that identifies a result set, wherein the bucket table column identifies a bucket table in which a result set is stored, wherein the result sets table of contents comprises a table in the database that is separate from the bucket tables;
means for storing one or more result sets in the bucket tables, wherein each result set was generated by executing a query;
means for receiving input from the system administrator indicating changes to the number of result sets that are to be stored in the bucket tables and changes to the number of bucket tables that are to be stored in the database; and means for, in response to receiving the input from the system administrator indicating the changes, means for, in response to determining that the input received from the system administrator indicates that the number of result sets has increased and the number of bucket tables has decreased, recalculating values in the bucket table column of the result sets table of contents for existing set identifiers to determine which bucket table is to store which result set and to determine one or more bucket tables to be dropped, dropping one or more empty bucket tables, and inserting additional rows into the result sets table of contents for the increased number of result sets; and means for, in response to determining that the input received from the system administrator indicates that the number of result sets has decreased and the number of bucket tables has increased, deleting rows in the result sets table of contents for existing set identifiers, recalculating values in the bucket table column of the result sets table of contents for remaining set identifiers to determine which bucket table is to store which result set, and creating one or more bucket tables.

2. The system of claim 1, further comprising:

means for receiving input from the system administrator indicating that the number of result sets has increased and that the number of bucket tables is unchanged; and means for, in response to determining that the input received from the system administrator indicates that the number of result sets has increased and the number of bucket tables is unchanged, inserting rows into the result sets table of contents to enable storage of additional result sets.

3. The system of claim 1, further comprising:

means for receiving input from the system administrator indicating that the number of result sets has decreased and that the number of bucket tables is unchanged; and means for, in response to determining that the input received from the system administrator indicates that the number of result sets that may be stored is decreased and the number of bucket tables is unchanged, deleting rows in the result sets table of contents.

4. The system of claim 1, further comprising:

means for receiving input from the system administrator indicating that the number of result sets is unchanged and that the number of bucket tables is changed; and means for, in response to determining that the input received from the system administrator indicates that the number of result sets is unchanged and the number of bucket tables has changed, recalculating values in the bucket table column of the result sets table of contents by determining which bucket table is to hold each of the one or more result sets based on a set identifier associated with each result set modulo the number of buckets that may hold result sets.

5. The system of claim 1, further comprising:

means for receiving input from the system administrator indicating that the number of result sets has decreased and that the number of bucket tables has decreased; and means for, in response to determining that the input received from the system administrator indicates that the number of result sets has decreased and the number of bucket tables has decreased, deleting rows in the result sets table of contents for existing set identifiers, recalculating values in the bucket table column of the result sets table of contents for remaining set identifiers, dropping one or more bucket tables, and removing result sets contained in the dropped bucket tables.

6. The system of claim 1, further comprising:

means for receiving input from the system administrator indicating that the number of result sets has increased and that the number of bucket tables has increased; and means for, in response to determining that the input received from the system administrator indicates that the number of result sets has increased and the number of bucket tables has increased, recalculating values in the bucket table column of the result sets table of contents for existing set identifiers, creating one or more bucket tables, and inserting additional rows into the result sets table of contents.

7. The system of claim 1, further comprising:

means for receiving a request for a result set holding content at a point in time; and means for returning the result set without re-executing a query from which the result set was generated.

8. The system of claim 1, further comprising:

means for receiving a request to execute a query that has been stored for one of the result sets that has been stored; and means for executing the query to generate a new result set.

9. The system of claim 1, wherein the result set management is performed at one of a data store engine, a web application server that communicates with the data store engine, and on separate multiple servers.

10. The system of claim 1, wherein the result sets may be stored in one or more data stores at one or more server computers.

11. The system of claim 1, further comprising:

means for, when at least one of the number of result sets that may be stored and the number of bucket tables that may hold result sets is modified, mapping existing result sets to set identifiers and bucket tables based on the modification, without moving contents of the existing result sets.

12. An article of manufacture comprising a computer readable medium including a program for result set management, wherein the program causes operations to be performed, the operations comprising:

receiving input from a system administrator of a number of result sets that are to be stored and a number of bucket tables that are to hold the result sets, wherein the number of result sets represents how many result sets are to be stored, and wherein the number of bucket tables represents how many bucket tables are to be stored in a database;

initializing a result sets table of contents that includes a row for each existing result set, a bucket table column, and a set identifier that identifies a result set, wherein the bucket table column identifies a bucket table in which a result set is stored, wherein the result sets table of contents comprises a table in the database that is separate from the bucket tables;

storing one or more result sets in the bucket tables, wherein each result set was generated by executing a query;

receiving input from the system administrator indicating changes to the number of result sets that are to be stored in the bucket tables and changes to the number of bucket tables that are to be stored in the database; and in response to receiving the input from the system administrator indicating the changes, in response to determining that the input received from the system administrator indicates that the number of result sets has increased and the number of bucket tables has decreased, recalculating values in the bucket table column of the result sets table of contents for existing set identifiers to determine which bucket table is to store which result set and to determine one or more bucket tables to be dropped, dropping one or more empty bucket tables, and inserting additional rows into the result sets table of contents for the increased number of result sets; and in response to determining that the input received from the system administrator indicates that the number of result sets has decreased and the number of bucket tables has increased, deleting rows in the result sets table of contents for existing set identifiers, recalculating values in the bucket table column of the result sets table of contents for remaining set identifiers to determine which bucket table is to store which result set, and creating one or more bucket tables.

13. The article of manufacture of claim 12, wherein the operations further comprise:

receiving input from the system administrator indicating that the number of result sets has increased and that the number of bucket tables is unchanged; and in response to determining that the input received from the system administrator indicates that the number of result sets has increased and the number of bucket tables is unchanged, inserting rows into the result sets table of contents to enable storage of additional result sets.

14. The article of manufacture of claim 12, wherein the operations further comprise:

receiving input from the system administrator indicating that the number of result sets has decreased and that the number of bucket tables is unchanged; and in response to determining that the input received from the system administrator indicates that the number of result sets that may be stored is decreased and the number of bucket tables is unchanged, deleting rows in the result sets table of contents.

15. The article of manufacture of claim 12, wherein the operations further comprise:

receiving input from the system administrator indicating that the number of result sets is unchanged and that the number of bucket tables is changed; and in response to determining that the input received from the system administrator indicates that the number of result sets is unchanged and the number of bucket tables has changed, recalculating values in the bucket table column of the result sets table of contents by determining which bucket table is to hold each of the one or more result sets based on a set identifier associated with each result set modulo the number of buckets that may hold result sets.

16. The article of manufacture of claim 12, wherein the operations further comprise:

receiving input from the system administrator indicating that the number of result sets has decreased and that the number of bucket tables has decreased; and in response to determining that the input received from the system administrator indicates that the number of result sets has decreased and the number of bucket tables has decreased, deleting rows in the result sets table of contents for existing set identifiers, recalculating values in the bucket table column of the result sets table of contents for remaining set identifiers, dropping one or more bucket tables, and removing result sets contained in the dropped bucket tables.

17. The article of manufacture of claim 12, wherein the operations further comprise:

receiving input from the system administrator indicating that the number of result sets has increased and that the number of bucket tables has increased; and in response to determining that the input received from the system administrator indicates that the number of result sets has increased and the number of bucket tables has increased, recalculating values in the bucket table column of the result sets table of contents for existing set identifiers, creating one or more bucket tables, and inserting additional rows into the result sets table of contents.

18. The article of manufacture of claim 12, wherein the operations further comprise:

receiving a request for a result set holding content at a point in time; and returning the result set without re-executing a query from which the result set was generated.

19. The article of manufacture of claim 12, wherein the operations further comprise:

receiving a request to execute a query that has been stored for one of the result sets that has been stored; and executing the query to generate a new result set.

20. The article of manufacture of claim 12, wherein the result set management is performed at one of a data store engine, a web application server that communicates with the data store engine, and on separate multiple servers.

21. The article of manufacture of claim 12, wherein the result sets may be stored in one or more data stores at one or more server computers.

22. The article of manufacture of claim 12, wherein the operations further comprise:

when at least one of the number of result sets that may be stored and the number of bucket tables that may hold result sets is modified, mapping existing result sets to set identifiers and bucket tables based on the modification, without moving contents of the existing result sets.

* * * * *